(12) United States Patent
Miller

(10) Patent No.: US 10,405,041 B2
(45) Date of Patent: Sep. 3, 2019

(54) SYSTEMS AND METHODS FOR PREDICTIVE SPOILER PREVENTION IN MEDIA ASSETS BASED ON USER BEHAVIOR

(71) Applicant: Rovi Guides, Inc., San Carlos, CA (US)

(72) Inventor: Ashleigh A. Miller, Denver, CO (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/362,331

(22) Filed: Nov. 28, 2016

(65) Prior Publication Data

US 2018/0152759 A1 May 31, 2018

(51) Int. Cl.

| H04N 7/16 | (2011.01) |
|---|---|
| H04N 21/454 | (2011.01) |
| H04N 21/45 | (2011.01) |
| H04N 21/475 | (2011.01) |
| H04N 21/488 | (2011.01) |
| H04N 21/81 | (2011.01) |
| H04N 21/466 | (2011.01) |
| G06Q 10/10 | (2012.01) |
| G06F 16/22 | (2019.01) |
| G06F 16/2455 | (2019.01) |
| H04N 21/442 | (2011.01) |
| G06Q 50/00 | (2012.01) |

(52) U.S. Cl.
CPC .......... *H04N 21/454* (2013.01); *G06F 16/22* (2019.01); *G06F 16/2455* (2019.01); *G06Q 10/1095* (2013.01); *H04N 21/44222* (2013.01); *H04N 21/4532* (2013.01); *H04N 21/4667* (2013.01); *H04N 21/475* (2013.01); *H04N 21/4882* (2013.01); *H04N 21/812* (2013.01); *G06Q 50/01* (2013.01)

(58) Field of Classification Search
CPC .... H04N 21/254; H04N 21/251; H04N 21/25; H04N 21/23418; H04N 21/25891; H04N 21/44029; H04N 21/44222; H04N 21/4542; H04N 21/466; H04N 21/4667
See application file for complete search history.

(56) References Cited

U.S. PATENT DOCUMENTS

| 6,239,794 B1 | 5/2001 | Yuen et al. |
|---|---|---|
| 6,388,714 B1 | 5/2002 | Schein et al. |
| 6,564,378 B1 | 5/2003 | Satterfield et al. |
| 6,756,997 B1 | 6/2004 | Ward et al. |

(Continued)

*Primary Examiner* — Pankaj Kumar
*Assistant Examiner* — Timothy R Newlin
(74) *Attorney, Agent, or Firm* — Haley Guiliano LLP

(57) ABSTRACT

Systems and methods for preventing spoilers from being presented to a user based on user activity are described herein. In some embodiments, the media guidance application may predict events that a user may not wish to be spoiled based on user activity, and prevent spoilers for the predicted events from being presented. For example, by using received data identifying purchase activities associated with the user, a media guidance application may identify events associated with the purchase activity. The media guidance application may identify content associated with these events, and prevent the identified content from being presented to the user in response to determining that the identified content includes spoilers for the events.

20 Claims, 14 Drawing Sheets

(56) References Cited

U.S. PATENT DOCUMENTS

| | | | |
|---|---|---|---|
| 7,080,392 B1* | 7/2006 | Geshwind | H04N 5/76 348/E7.031 |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 8,161,082 B2* | 4/2012 | Israel | G06F 17/30038 707/803 |
| 9,363,458 B2 | 6/2016 | Hanai | |
| 9,762,943 B2* | 9/2017 | Uhrich | H04N 21/2668 |
| 2002/0174430 A1 | 11/2002 | Ellis et al. | |
| 2003/0010819 A1* | 1/2003 | Sako | G06Q 30/0224 235/379 |
| 2003/0110499 A1 | 6/2003 | Knudson et al. | |
| 2005/0251827 A1 | 11/2005 | Ellis et al. | |
| 2006/0136589 A1* | 6/2006 | Konig | G06F 17/30867 709/224 |
| 2007/0124752 A1* | 5/2007 | Sakai | G11B 27/28 725/8 |
| 2007/0157237 A1 | 7/2007 | Cordray et al. | |
| 2007/0157249 A1* | 7/2007 | Cordray | G06F 3/0482 725/58 |
| 2008/0052226 A1* | 2/2008 | Agarwal | G06F 17/277 705/39 |
| 2008/0127063 A1* | 5/2008 | Silva | H04L 12/2809 717/107 |
| 2010/0153885 A1 | 6/2010 | Yates | |
| 2010/0179867 A1* | 7/2010 | Hughes | G06Q 10/02 705/14.5 |
| 2011/0093905 A1* | 4/2011 | McKinley | H04N 7/17336 725/92 |
| 2012/0072941 A1* | 3/2012 | Thornberry | H04N 7/163 725/14 |
| 2013/0173796 A1* | 7/2013 | Grab | H04N 21/251 709/225 |
| 2013/0294755 A1* | 11/2013 | Arme | A61B 18/1492 386/344 |
| 2013/0297706 A1 | 11/2013 | Arme et al. | |
| 2014/0026156 A1* | 1/2014 | Deephanphongs | H04N 21/25866 725/12 |
| 2014/0101244 A1 | 4/2014 | Klein et al. | |
| 2014/0101706 A1* | 4/2014 | Kardatzke | H04N 21/4334 725/86 |
| 2014/0123164 A1* | 5/2014 | Inkumsah | H04N 21/251 725/14 |
| 2014/0150001 A1* | 5/2014 | McMillan | H04N 21/44213 725/9 |
| 2014/0214980 A1 | 7/2014 | Jung | |
| 2014/0297260 A1 | 10/2014 | Allen | |
| 2014/0373065 A1 | 12/2014 | Tsang et al. | |
| 2015/0089372 A1 | 3/2015 | Mandalia et al. | |
| 2015/0172787 A1 | 6/2015 | Geramifard | |
| 2015/0264445 A1 | 9/2015 | Lock | |
| 2015/0348157 A1 | 12/2015 | Garcia | |
| 2015/0382061 A1* | 12/2015 | Maisenbacher | H04N 21/4542 725/28 |
| 2016/0014461 A1 | 1/2016 | Leech et al. | |
| 2016/0105733 A1* | 4/2016 | Packard | H04N 21/8549 725/32 |
| 2016/0148123 A1 | 5/2016 | Paleja et al. | |
| 2016/0191999 A1* | 6/2016 | Friedrich | H04N 21/4542 725/39 |
| 2016/0261915 A1* | 9/2016 | Niebres | H04N 21/4542 |

* cited by examiner

200

Because You Like "Punk and Indie Rock Bands," We Want to Warn You that the Content You Requested May Contain Spoilers for the Upcoming "Sleater-Kinney" Tour.
202
How Would You Like to Proceed?

| | |
|---|---|
| 204 | A) Access the Content Anyway |
| 206 | B) Access the Content as a Later Time |
| 208 | C) Block Potential Spoilers from Being Shown |

We Noticed You Purchased Tickets for a "Star Wars Midnight Screening Marathon." We Want to Warn You that the Content You Requested May Contain Spoilers for the New "Star Wars" Movie.
302
How Would You Like to Proceed?

| | |
|---|---|
| 304 | A) Access the Content Anyway |
| 306 | B) Watch Walking Dead on VOD |
| 308 | C) Watch Zombie Attack! on TBS |
| 310 | D) Return to the Program Guide |

FIG. 3

| | Event Name | Event ID | Event Features | Associated Events | Associated Purchase Codes |
|---|---|---|---|---|---|
| 412 | Dolly Parton Sings! | AA123 | Live Event | BB234 | X012Y |
| | | | Music Concert | CC345 | X013Y |
| | | | Genre: Country | | X014Y |
| 414 | Jack White Croons! | BB234 | Live Event | AA123 | Z14YX |
| | | | Music Concert | | Z13YX |
| | | | Genre: Country | | |
| 416 | "9 to 5" | CC345 | Scheduled Broadcast | AA123 | |
| 418 | Yankees vs. Red Sox | DD456 | Live Event | EE678 | QR123 |
| | | | Baseball Game | | TZ234 |
| 420 | Yankees vs. Red Sox on ESPN | EE678 | Scheduled Broadcast of Live Event | DD456 | |
| | | | Baseball Game | | |
| 422 | The Walking Dead Season Premiere | FF789 | Scheduled Broadcast | RR123 | SCI76 |
| | | | Genre: Horror | II234 | |
| | | | Zombie Themed | | |
| 424 | The Walking Dead Recap Show | RR123 | Scheduled Broadcast | FF789 | |
| | | | Talk Show | II234 | |
| 426 | The Walking Dead Premiere Rerun | II234 | Scheduled Broadcast | FF789 | |
| | | | Genre: Horror | RR123 | |
| | | | Zombie Themed | | |
| 428 | Evil Dead! | JJ345 | Live Event | KK456 | SCI76 |
| | | | Midnight Movie | | |
| | | | Genre: Horror | | |
| | | | Zombie Themed | | |
| 430 | See Evil Dead with Tom | KK456 | Calendar Appointment for Live Event | JJ345 | SCI76 |
| | | | Midnight Movie | | |
| | | | Genre: Horror | | |
| | | | Zombie Themed | | |

FIG. 4

| | Asset/Event Title | Identifier (ID) | Keywords | Description | Associated Assets or Events | Spoilers for Associated Asset/Event? |
|---|---|---|---|---|---|---|
| 514 | The Walking Dead Future Episode | WW234 | Scheduled Broadcast | The Season Continues with All New Adventures. | FF789 | Yes |
| | | | Genre: Horror | | RR123 | No |
| | | | Zombie Themed | | | |
| 516 | The Walking Dead Recap Show | RR123 | Talk Show | Guest Star Jonah Ray Joins to Crew to Talk About the New Season, and his Upcoming Comedy Special. | FF789 | Yes |
| | | | Recap Show | | WW234 | No |
| | | | Jonah Ray Spoilers | | TT456 | Yes |
| | | | Zombie Themed | | | |
| 518 | The Walking Dead Season Premiere | FF789 | New Show | The All New Season Kicks off with Crazy Zombie Adventures! | RR123 | No |
| | | | Genre: Horror | | WW234 | No |
| | | | Zombie Themed | | | |
| 520 | Jonah Ray Yuks it Up! | TT456 | Scheduled Broadcast | Jonah's Hilarious New Special with a Surprising Twist. Watch Jonah Make Jokes and "Clown" Around! | RR123 | No |
| | | | Genre: Horror | | | |
| | | | Zombie Themed | | | |

| | Purchase Code | Purchase Source | Associated Events | Event ID | Purchase Description |
|---|---|---|---|---|---|
| 612 | X012Y | TicketMaster | Dolly Parton Sings! | AA123 | Multi-Day Dolly Parton Tour Pass |
| | | | "9 to 5" | BB234 | |
| | | | Dolly Parton Sings Again! | PM234 | |
| 614 | SCI76 | Fandango | Evil Dead! | JJ234 | General Admission for Evil Dead with Walking Dead Sneak Peek |
| | | | See Evil Dead with Tom | KK456 | |
| | | | The Walking Dead Season Premiere | FF789 | |
| 616 | THX38 | Amazon.com | Star Wars Remastered | LK123 | Darth Vader Replica Costume With Helmet |
| | | | George Lucas Charity Booster | FM123 | |
| | | | Star Wars Release Party | NZ123 | |

FIG. 6

SYSTEMS AND METHODS FOR PREDICTIVE SPOILER PREVENTION IN MEDIA ASSETS BASED ON USER BEHAVIOR

BACKGROUND

Given the wide variety and number of content sources through which media can be delivered to consumers, it is increasingly difficult for users to avoid "spoilers," information about future content that may ruin surprises or key plot points. This problem is exacerbated by the proliferation of the Internet and social media, which may result in users being constantly inundated with information about future movies, games, media, events, or other types of content. Although some content makers attempt to address this problem by voluntarily warning users about potential spoilers (e.g., through the use of brief "spoiler warnings" presented at the beginning of the content), many content makers neglect to warn users about potential spoilers, and users are often distracted and fail to notice these warnings even when they are present. Some conventional systems also attempt to address this problem by preventing spoilers from being presented for programs that a user has recorded with a home digital video recorder. However, in addition to being limited to programs that the user has explicitly chosen to recorded, this type of system still places an undue burden on users to explicitly consider and identify all of the future content that they are planning to consume that should not be spoiled.

SUMMARY

Accordingly, systems and methods are presented for predicting content that a user does not want to be spoiled based on user behavior, and preventing spoilers for the predicted content from being presented to the user. The systems and methods may be used to prevent spoilers from being presented to the user without the user needing to explicitly identify future content that should not be spoiled. For example, by receiving contents of a user profile, a user activity log, a purchase history, a list of scheduled recordings on the user's home DVR, or other data indicative of user activities, a media guidance application may use that data to predict future content that the user may not wish to be spoiled. This may be done, for example, by using a database to identify content associated with the particular user activity, and using that information to predict other related content that is likely to be of interest to the user. The media guidance application may then identify content that includes spoilers for the predicted future content, and prevent content containing spoilers from being presented to the user.

In some aspects, the media guidance application stores a database of event entries, wherein each of the event entries includes an event information field that includes a feature that appears in the respective event. For example, the media guidance application may store and maintain a database of events, such as movies presented in a movie theater, concerts, live events, media assets scheduled for transmission, or calendar appointments. For each of the events in the database, the media guidance application may store a list of features for the event, such as a person, character, or band associated with the event, a general category or genre of the event, a location and time of the event, a scene within the event, or any other suitable feature.

The media guidance application then receives data identifying an activity performed by the user. For example, the media guidance application may receive data identifying a social media communication made by the user, user attendance of a live event, user interactions with computer applications, user interactions with websites accessible via the Internet, or user interactions with a set-top box. The received data may also indicate that the user accessed a media asset, purchased a media asset, ordered a media asset, purchased a ticket for attending an event, added an appointment to a calendar, or the like.

The media guidance application then determines, based on the received data, a first event associated with the identified activity performed by the user. For example, if the user purchases tickets to a movie screening, the media guidance application may receive data from the ticket vendor indicating the time, location, and identity of the movie, or other information that can be used to determine the particular movie screening associated with the user's purchase. In general, the media guidance application may detect an event identification code contained in the received data, and use this code to determine events associated with the activity performed by the user. The media guidance application may also access a database containing a listing of events associated with particular types of user activities, such as a purchases database that can be used to look up events associated with each of a user's purchases.

The media guidance application then searches the database of event entries to identify an event entry that is associated with the determined first event. For example, if the media guidance application determines that a ticket purchased by the user is associated with a live performance of the musical "The Producers," the media guidance application may search the database of event entries to find entries associated with the live performance of "The Producers."

The media guidance application the retrieves, from the event information field associated with identified event entry, the feature that appears in the determined first event. For example, the media guidance application may access one of the event information fields associated with the event entry representing the live performance of "The Producers," and retrieve the name of the original writer, "Mel Brooks." In general, the event entry in the database for the live performance of "The Producers" may include event information fields for various features associated with "The Producers," such as the genre of the live performance, the actors in the performance, the characters portrayed within the performance, the original writer and director, and the like.

The media guidance application then searches the event information fields stored in the database to identify a plurality of event entries that each includes an event information field having a given feature that corresponds to the retrieved feature. For example, if the feature retrieved by the media guidance application was the name "Mel Brooks," the media guidance application will search the database and identify other event entries that have information fields containing the name "Mel Brooks."

The media guidance application then selects a first of the plurality of event entries that is associated with a second event that matches a user profile. For example, if the user profile indicates that the user enjoys film festivals, the media guidance application may take the previously identified entries that include the name "Mel Brooks" in one of the information fields and select an event entry for a comedy film festival hosted by Mel Brooks that includes the debut of the new film "Get Smart 2" as the second event entry that matches the user profile.

In some embodiments, selecting the first entry includes the media guidance application determining a preferred feature based on the user profile. For example, the media guidance application may determine that the user enjoys film festivals based on the information contained within the user profile, and determine that the user may enjoy events that are associated with the preferred feature "Film Festival." The media guidance application may then identify, from the plurality of event entries, a subset of event entries including a first event information field having the given feature and a second event information field having the preferred feature. For example, from the list of event entries that include information fields containing the name "Mel Brooks," the media guidance application may identify a subset of event entries that also include information fields including the feature "Film Festival." The media guidance application may then select one of the subset of entries as the first event entry.

In some embodiments, determining a preferred feature based on the user profile includes the media guidance application determining, from the user profile, a plurality of past activities performed by the user. For example, the media guidance application may access a purchase history from the user profile, and use it to determine the recent purchases made by the user. The media guidance application may then determine a plurality of previous events associated with the plurality of past activities performed by the user, each of the plurality of previous events being associated with at least one of the plurality of past activities. For example, if the activities are previous user purchases, the media guidance application may determine each of the events associated with the previous user purchases, and compile them into a single list of events. The media guidance application may then search the database of event entries to identify a plurality of event entries associated with the determined plurality of previous events, and determine a preferred feature that appears in event entries associated with each of the plurality of previous events. For example, the media guidance application may search for each of the events associated with the previous purchases in a database, and determine that several of the events include the feature "Film Festival." In this case, the media guidance application may determine that the user is likely to enjoy other events that include the feature "Film Festival," and designate the feature "Film Festival" as a preferred feature.

The media guidance application then identifies content associated with the second event. The content may be a media asset, a social media communication, an advertisement, a text or SMS message, a commercial, another event, or any other type of content. For example, if the second event is a comedy film festival that includes the debut of the new film "Get Smart 2," the identified content may be a social media post referencing the film festival, or an episode of a talk show where the stars of the new film "Get Smart 2" are invited as guests. In some embodiments, the media guidance application identifies the content by monitoring other content being accessed by the user, and searching for a plurality of content likely to be accessed by the user within a threshold period of time in the future. For example, if the media guidance application determines that the user is changing channels and viewing various late-night talk shows in quick succession, the media guidance application may search for other talk shows being presented within the next hour that are associated with the comedy film festival. As another example, if the media guidance application determines that a user is currently watching the end of an on-demand video or a recording from a DVR, and that the user will return to watching live television programming within the next ten minutes, the media guidance application may search for live television programming being broadcast in the next ten minutes that is associated with the comedy film festival.

The media guidance application then processes metadata associated with the identified content to determine whether the metadata indicates that the identified content includes a spoiler for the second event. For example, once the media guidance application determines that a particular episode of the talk show is associated with the film festival, the media guidance application may use metadata associated with that episode of the talk show in order to determine if that episode contain spoilers for the film festival. In some embodiments, processing the metadata includes the media guidance application determining, based on the metadata, whether the identified content is associated with a user-generated flag indicating that the identified content contains a spoiler for the second event. For example, other users may mark certain types of content as containing spoilers for particular events, resulting in a "spoiler warning" flag being stored within the metadata that may be detected by the media guidance application.

The media guidance application then prevents the identified content from being presented to the user in response to determining that the metadata indicates that the identified content includes the spoiler. For example, if the media guidance application determines that a particular episode of a talk show contains spoilers for the upcoming film festival, the media guidance application may prevent that episode of the talk show from being presented to the user. In some embodiments, the media guidance application may determine whether the user has previously accessed the identified content, and allow the identified content to be presented to the user in response to determining that the metadata indicates that the identified content includes a spoiler. This may be done instead of instead of preventing the identified content from being presented to the user. For example, if the media guidance application determines that the episode of the talk show has already been presented to the user in the past, the media guidance application may simply present the episode to the user rather than preventing it from being presented, despite the fact that it may contain a spoiler.

In some embodiments, preventing the identified content from being presented includes the media guidance application receiving, from the user, a request to access the identified content. For example, if the identified content is an episode of a particular talk show, the media guidance application may receive a request to tune to a broadcast of the talk show. The media guidance application may then present, to the user, in response to receiving the request, alternate content different from the identified content. For example, the media guidance application may tune to a broadcast of a different talk show instead.

In some embodiments, preventing the identified content from being presented includes the media guidance application determining that the identified content is about to be presented to the user without the user's input. For example, if the user is about to finish watching a DVR recording, the media guidance application may normally be configured to automatically return the user to whatever live channel he or she was watching before he or she accessed the DVR recording. In this case, the media guidance application may determine if the live channel the user was previously watching is displaying the identified content. If the media guidance application determines that the live channel is indeed displaying the identified content, the media guidance application may prevent the identified content from being presented to the user by returning the user to an alternative live channel instead.

In some embodiments, the alternate content may include a selectable option, the selectable option comprising at least one of an option to have the identified content presented, an option to delay presentation of the identified content to a later time, and an option to not view the identified content. For example, instead of simply presenting the talk show to the user, the media guidance application may display a prompt, warning the user that the content that he or she requested may contain spoilers, and asking the user how he or she wishes to proceed.

In some embodiments, presenting the alternate content may include the media guidance application identifying a possible content alternative, the possible content alternative being a type of content that is the same as the identified content. For example, if the identified content was an episode of a particular talk show, the media guidance application may identify episodes of other talk shows as potential content alternatives. The media guidance application may then process metadata associated with the possible content alternative to determine whether metadata associated with the possible content alternative indicates that the possible content alternative includes the spoiler for the second event. For example, if the originally requested talk show isn't presented because it contained spoilers for an upcoming film festival, the media guidance application may verify that the alternate content does not contain spoilers for the upcoming film festival. The media guidance application then presents the possible content alternative to the user as the alternate content in response to determining that the metadata associated with the possible content alternative indicates that the identified content does not include the spoiler.

In some aspects, the media guidance application receives data representing purchase activity associated with the user, wherein the data includes a source of the purchase and purchase information. For example, the media guidance application may receive data representing a user's purchase of a concert ticket, including data identifying the online retailer the ticket was purchased from, and other information about the purchase.

The media guidance application then retrieves the purchase information from the data and searches, using the purchase information, an events database to identify an event entry having a first event information field that matches the purchase information. For example, the purchase information may include a purchase code that the media guidance application may use to search an events database and identify event entries for events associated with the purchase.

The media guidance application then, in response to determining that the events database includes the event entry having the first event information field that matches the purchase information, retrieves event information from a second event information field associated with the event entry. For example, the event entry in the database for an upcoming concert, "Dolly Parton Sings!," may include information fields for the title of the concert, the different bands featured in the concert, the start time and end time of the concert, an event identifier that can be used to search for additional information about the event in other databases, a list of other related content and events, and the various types of purchase information or purchase codes associated with the concert. If the media guidance application determines that purchase information matches one of the fields for the database entry associated with a particular performance of the concert "Dolly Parton Sings!," the media guidance application may retrieve event information from one of the other fields of the entry associated with that performance of the concert "Dolly Parton Sings!," such as an event identifier or the time and title of the concert.

Alternatively, the media guidance application, in response to determining that none of the event entries in the events database includes an event entry having an event information field that matches the purchase information, requests the event information from the source of the purchase in the data. For example, if there are no entries in the database that have information fields matching the received purchase information, the media guidance application may directly request event information from the retailer that provided the purchase information. This information may include an event identifier, the time and title of the event, or any other type of suitable information about the event.

In some embodiments, requesting, from the source of the purchase, event information associated with the purchase information includes the media guidance application identifying the source that received the purchase from the user based on the received data. For example, if the received data includes data identifying the source of the purchase, such as a particular online vender, the media guidance application may simply use the received data in order to identify the source. The media guidance application then searches for an account associated with the user for accessing the identified source. For example, if the identified source is a particular online retailer, the media guidance application may search for the user's account with that online retailer. In this situation, the media guidance application may, for example, access previously stored user credentials for the account, or prompt the user to provide information about his or her account, such as his or her username. The media guidance application then transmits a request to the source, based on the determined account, for the event information associated with the purchase. For example, the media guidance application may use the application programming interface (API) for the online retailer's website to submit a request for additional information regarding the user's purchase, identifying the user by including the username associated with the user in the request. In some embodiments, the transmitted request may include user credentials, the user credentials being usable by the source to verify that the request was approved by the user. For example, particular online retailers may prevent information about user purchases from being shared unless the user provides a password. In this situation, the media guidance application may prompt the user for his or her password and include this information in the request. As another example, the online retailer may require that the request be made from an authenticated user device, and the media guidance application may access the appropriate authentication key and provide it along with the request.

In some embodiments, the media guidance application receives the event information requested from the source of the purchase in the data. For example, this information may include an event identifier, the time and title of the event, or any other type of suitable information about the event. The media guidance application then submits, to the events database, a request to create a new event entry having a third event information field that matches the purchase information included in the received data, and a fourth event information field that matches the event information received. For example, the media guidance application may submit a request to create a new entry for the event including an event identifier, the time and title of the event, and the originally received purchase information. This may allow the media guidance application to easily look up the event associated with that particular purchase information in the future.

In some embodiments, the media guidance application stores, in a purchase activities database, purchase activities associated with the user, wherein the purchase activities database includes a plurality of purchase activity entries, and each purchase activity entry includes a purchase source field and an event information field. For example, the media guidance application may maintain an independent database tracking the purchases of one or more users. Such a database may include purchase activity entries that include information fields for the purchase source for each purchase, descriptions of the purchase, additional information about each purchase, purchase codes associated with the purchase, and events or other content associated with the purchase. The media guidance application then adds to the purchase activities database a new purchase activity entry for the received purchase activity associated with the user based on the event information associated with the purchase information. For example, if the media guidance application needed to request event information from the source of the purchase, this information can be stored as part of an entry in the purchase activities database along with the originally received purchase information. This may allow the media guidance application to detect trends in user purchases or help predict future purchases.

The media guidance application then selects, based on the event information, an event associated with the purchase activity. The selected event may be a movie presented in a movie theater, a concert, a live event, a media asset scheduled for transmission, a calendar appointment, or any other suitable type of event. For example, if the event information is the title of an event, "Dolly Parton Sings!," and the time of an upcoming event, the media guidance application may use this information to search an events database and identify the exact performance of the "Dolly Parton Sings!" concert associated with the purchase activity.

In some embodiments, selecting an event associated with the purchase activity includes a media guidance application identifying, using the events database, an event associated with the event information. For example, the event database may store information about multiple events, and list features of the each event such as a person, character, or band associated with the event, a general category or genre for the event, a location and time of the event, a title of the event, a scene within the event, an event identifier associated with the event, other events or other types of content associated with the event, or any other type of suitable information. In this situation, the media guidance application may use the event information to search for events associated with the event information, and select one of the identified events from the events database. The media guidance application then determines, using the events database, a plurality of related events associated with the identified event. For example, if the identified event was a "Dolly Parton Sings!" country and western concert, related events associated with the "Dolly Parton Sings!" concert might include other "Dolly Parton" concerts, or other types of country and western concerts. The media guidance application then selects, as the event associated with the purchase activity, one of the plurality of related events. For example, if the media guidance application previously identified a number of "Garth Brooks featuring Dolly Parton" concerts as being associated with the "Dolly Parton Sings!" concert, one of the "Garth Brooks featuring Dolly Parton" concerts may be selected as the event associated with the purchase activity.

The media guidance application then identifies content associated with the selected event. The content may include, for example, a media asset, a social media communication, an advertisement, a text or SMS message, a commercial, other events, or any other type of suitable content that may be presented to the user. For example, if the selected event is a Sunday night performance of the "Dolly Parton Sings!" concert, the identified content may be a series of social media messages about an earlier performance of the same "Dolly Parton Sings!" concert.

In some embodiments, identifying the content includes the media guidance application monitoring other content being accessed by the user, and searching for a plurality of content likely to be accessed by the user within a threshold period of time in the future. For example, if the media guidance application determines that the user is browsing through several friends' social media postings, and is likely to continue doing so for the next hour, the media guidance application may continue to search for social media postings made by the user's friends related to the "Dolly Parton Sings!" concert for at least the next hour.

The media guidance application then processes metadata associated with the identified content to determine whether the metadata indicates that the identified content includes a spoiler for the selected event. For example, the media guidance application may use the metadata associated with the social media postings to determine if the social media postings contain spoilers for the Sunday night performance of the "Dolly Parton Sings!" concert.

The media guidance application then prevents the identified content from being presented to the user in response to determining that the metadata indicates that the identified content includes the spoiler. For example, if it determined that the social media postings contain spoilers, such as revealing the set list for the concert or revealing the identity of various surprise guests that make an appearance in the concert, the media guidance application may prevent the social media posts from being presented to the user.

In some embodiments, preventing the identified content from being presented includes the media guidance application receiving, from the user, a request to access the identified content. For example, if the identified content is a social media communication originating from one of the user's friends, the media guidance application may receive a request from the user to view the social media communications made by the friend. The media guidance application then presents, to the user, in response to receiving the request, alternate content different from the identified content. For example, the media guidance application may display a prompt asking the user if he or she wishes to proceed, or the media guidance application may display censored versions of the social media communications with the spoilers removed or redacted.

In some embodiments, preventing the identified content from being presented includes the media guidance application determining an end time for the event associated with the purchase activity. For example, if the Sunday night performance of the "Dolly Parton Sings!" concert is the event associated with the user's purchase activity, the media guidance application may use the events database to look up an end time for the Sunday night performance of the "Dolly Parton Sings!" concert. The media guidance application then prevents the identified content from being presented in response to determining that the current time is earlier than the end time. For example, if the identified content is a series of social media communications made by the user's friends, the media guidance application may prevent those social media communications from being displayed to the user until after the "Dolly Parton Sings!" concert has ended.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows an illustrative example of alternate content provided to the user when preventing content from being presented, in accordance with some embodiments of the disclosure;

FIG. 3 shows another illustrative example of alternate content provided to the user when preventing content from being presented, in accordance with some embodiments of the disclosure;

FIG. 4 shows an illustrative events database, which may be used in accordance with some embodiments of the disclosure.

FIG. 5 shows an illustrative content database, which may be used in accordance with some embodiments of the disclosure.

FIG. 6 shows an illustrative purchase activity database, which may be used in accordance with some embodiments of the disclosure.

DETAILED DESCRIPTION

Figure 1:
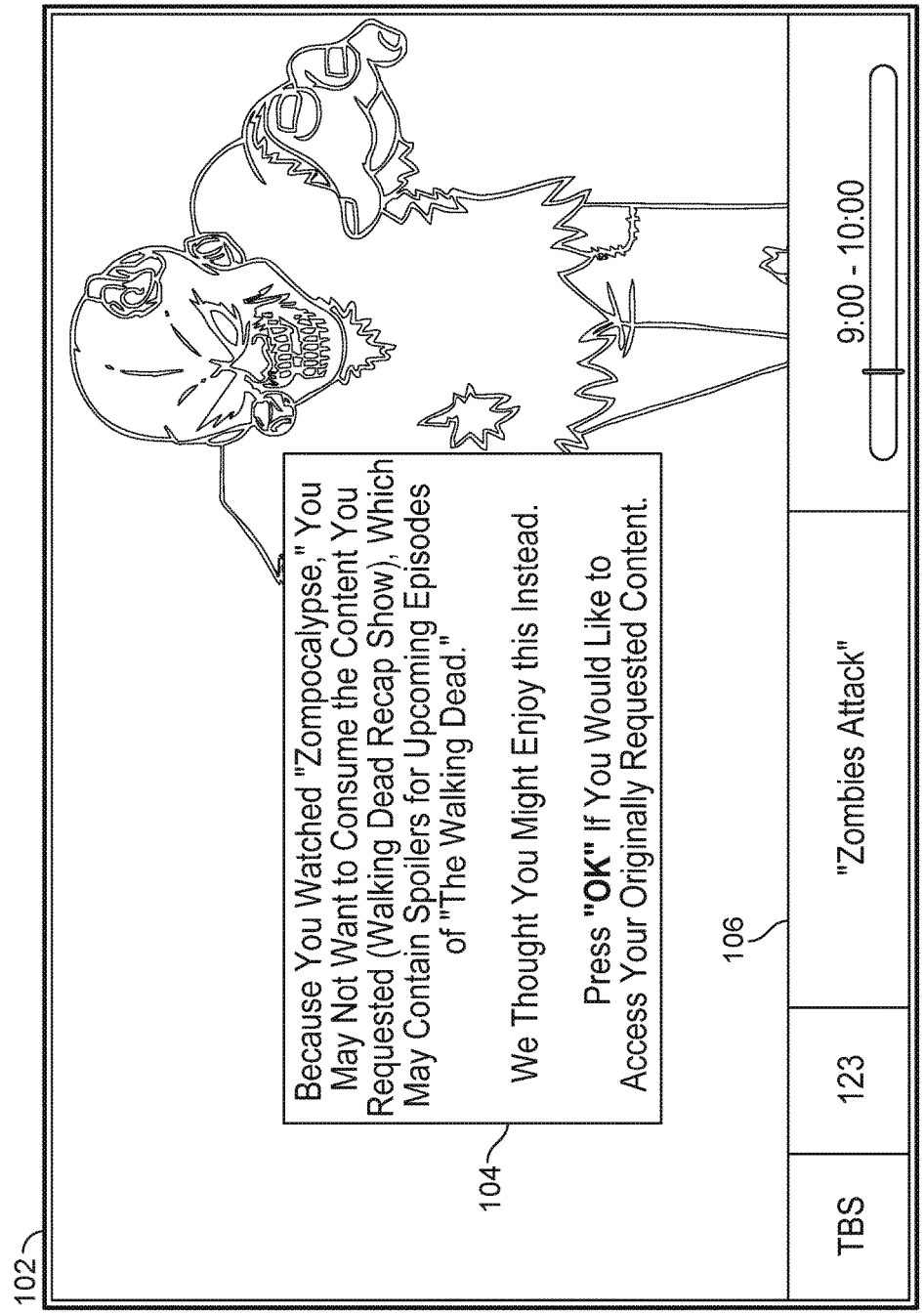
FIG. 1 shows an illustrative example of preventing content from being presented to a user in response to determining that the content may contain spoilers, in accordance with some embodiments of the disclosure.

Systems and methods are presented for predicting content that a user does not want to be spoiled based on user behavior, and preventing spoilers from being presented to the user. The systems and methods may be used to prevent spoilers from being presented to the user without the user needing to explicitly identify future content that should not be spoiled. For example, by receiving contents of a user profile, a user activity log, a purchase history, a list of the scheduled recordings on the user's home DVR, or other data indicative of user activities, a media guidance application may use that data to determine future content that the user may not wish to be spoiled. This may be done, for example, by using a database to identify content associated with the particular user activity, and using that information to identify other related content or events that are likely to be of interest to the user. The media guidance application may then identify content which includes spoilers for the related content or events, and prevent that content from being presented to the user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms.

Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.) on-demand information, blogs, websites, and any other type of guidance data that is helpful for a user to navigate among and locate desired content selections.

FIG. 1 shows an illustrative example of preventing content from being presented to a user in response to determining that the content may contain spoilers, in accordance with some embodiments of the disclosure. The media guidance application may determine that certain content contains spoilers for an upcoming event that the user may not want to be spoiled, and prevent the content from being presented to the user in response. Various systems and methods that may be used in one or more embodiments to determine that content contains spoilers are discussed in relation to FIGS. 11-18, and may make use of the various databases and systems discussed in relation to FIGS. 4-10. For example, the media guidance application may have received data indicating that the user recently watched the movie "Zompocalypse," a zombie horror film. Based on that data, the media guidance application may have determined that the user is likely to watch an upcoming episode of "The Walking Dead," a zombie-themed television show, and would not want the upcoming episode to be spoiled.

Display screen 100 may be generated for display by a media guidance application, or by another application or device running in tandem with the media guidance application. Display screen 100 may be displayed, for instance, on a monitor or television display connected to a set-top box running the media guidance application (e.g., display 912 (FIG. 9)). Display screen 100 includes content display area 102. In general, display area 102 may display content requested by the user, or it may display whatever content is being broadcast by a channel currently being tuned to by the media guidance application.

When the media guidance application determines that user-requested content may contain spoilers, it may instead display alternate content in display area 102. For example, the media guidance application may receive user input (e.g., via user input interface 910 (FIG. 9)) requesting that the media guidance application tune to a channel that is displaying an episode of "The Walking Dead Recap Show," a television program where a panel of guests discuss episodes of "The Walking Dead" television program, and which generally contains spoilers for episodes of "The Walking Dead" television program. In this situation, if the media guidance application has determined that user is likely to watch the upcoming episode of "The Walking Dead" television program and may not want the episode to be spoiled, the media guidance application may display alternate content within display area 102 rather than the requested episode of "The Walking Dead Recap Show" television program. In some embodiments, when the requested content is being broadcast on a television channel, the media guidance application may tune to a different channel instead and display the resulting broadcast within display area 102. In some embodiments, the media guidance application may identify alternate content that is similar to the requested content. For example, if the originally requested content was a zombie-themed television program, the alternate content may be a different zombie-themed television program. As another example, if the originally requested content was a movie, the alternate content may be a different movie.

As part of the alternate content, the media guidance application may display prompt 104 within display area 102. In general, prompt 104 may inform the user about the potential spoiler, and elaborate on what content or event the media guidance application was attempting to protect from being spoiled, why the media guidance application chose the content to be protected from being spoiled, or provide any other information that may be of interest to the user. For example, if the media guidance application is preventing an episode of "The Walking Dead Recap Show" from being displayed to the user, due to the fact that it may contain spoilers for the television program "The Walking Dead," this information may be provided to the user in prompt 104. Display screen 100 may also include a browser bar 106. Browser bar 106 may allow the user to see the content currently being provided by the media guidance application and allow the user to interact with the media guidance application while prompt 104 is displayed. In general, the user may still interact with the media guidance application and access any of the media guidance application functions while prompt 104 is being displayed.

In some embodiments, the alternate content may include one or more selectable options. These options may be displayed within prompt 104, and may include options to access the originally requested content, access the originally requested content at a later time, or to confirm that the originally requested content is not to be presented. For example, prompt 104 may include the option for the user to ignore the spoiler warning and access the originally requested content by providing the appropriate input on a remote control or other user input device. Other examples of selectable options that may be presented to the user are discussed in relation to FIG. 2 and FIG. 3.

FIG. 2 shows an illustrative example of alternate content provided to the user when preventing content from being presented, in accordance with some embodiments of the disclosure. Display 200 may be presented to the user as the alternate content, or it may be presented as part of a larger display of alternate content (e.g., as the prompt 104 of the display 100 in FIG. 1). Display 200 may include an informational prompt 202. In general, informational prompt 202 may inform the user about the potential spoiler, what event is potentially being spoiled, and elaborate on what factors the media guidance application considered when it determined that the event should be protected from being spoiled. For example, prompt 202 may inform the user that the media guidance application determined that the user enjoys "Punk and Indie Rock Bands," such as the band "Sleater-Kinney." The media guidance application may have determined this information any number of ways, for example, by analyzing information contained in a user profile associated with the user, or by making use of the various databases and systems discussed in relation to FIGS. 4-10 in conjunction with one or more of the methods discussed in relation to FIGS. 11-18. The prompt 202 may also inform the user that the media guidance application is preventing the content from being displayed because it may contain spoilers for an upcoming "Sleater-Kinney" tour.

Display 200 may include several selectable options 204-208. Selectable option 204 is an option to have the requested content presented. If a user selects the selectable option 204, the display 200 may disappear, and the originally requested content may be presented to the user, despite the fact that it potentially contains spoilers. Selectable option 206 is an option to delay presentation of the content to a later time. For example, if the requested content contains a spoiler for an upcoming "Sleater-Kinney" tour, the user may wish to delay the presentation of the content until after the "Sleater-Kinney" tour has ended. In some embodiments, the media guidance application may provide a suggested amount of time to delay presentation of the content in response to a user selecting an option to delay presentation of the content. For example, if the content contains spoilers for a particular event, the media guidance application may suggest delaying the presentation of the content until after the event has ended. In this case, the media guidance application may access metadata for the event from an events database (e.g., database 400 (FIG. 4)) to determine a scheduled end time for the event. Selectable option 208 is an option to block potential spoilers from being shown. In some embodiments, user selection of an option to block the spoilers will cause the media guidance application to censor the spoilers from the content. Depending on the type of content, the media guidance application may accomplish this by redacting written content, bleeping audio content, displaying censor bars over portions of visual content, or utilizing any other type of suitable censorship technique.

It will be understood that selectable options 204-208 are intended to be illustrative, and not limiting. In general, display 200 may contain any number of options, and may include other types of options. For example, one of the selectable options within display 200 may be an option for the content to not be shown, an option for a user to access different types of suggested content similar to the requested content, one of the selectable options discussed in relation to FIG. 3, or any other suitable option.

FIG. 3 shows another illustrative example of alternate content provided to the user when preventing content from being presented, in accordance with some embodiments of the disclosure. Similar to display 200 (FIG. 2), display 300 may be presented to the user as the alternate content, or it may be presented as part of a larger display of alternate content (e.g., as prompt 104 of display 100 (FIG. 1)). Display 300 may include an informational prompt 302, which may inform the user about the potential spoiler. For example, prompt 302 may inform the user that because the user purchased tickets for a show "Star Wars Midnight Screening Marathon," the media guidance application determined that the user may not want to view the requested content because it contains spoilers for the new "Star Wars" movie. In general, the media guidance application may have determined this information any number of ways, for example, by using one of the methods discussed in relation to FIG. 11 or FIG. 14, or by making use of the various databases and systems discussed in relation to FIGS. 4-10.

Display 300 may include several selectable options 304-310. Similar to selectable option 204 within display 200 (see FIG. 2), selectable option 304 is an option to ignore the warning of potential spoilers and have the requested content presented. Selectable option 306 is an option to not display the requested content, and to display different content instead. In general, the content suggested to the user in selectable option 306 may be chosen by the media guidance application based on any number of factors, including a user profile for a user, a purchase history for the user, a record of previous user behavior, or known preferences of the user. For example, if the media guidance application checks the recordings on the user's home DVR and notices that the user has recorded several zombie-themed television shows, the media guidance application may suggest that the user view a video-on-demand (VOD) copy of the zombie-themed television show "The Walking Dead" in place of the originally requested content.

Selectable option 308 is another option to not display the requested content, and to display different content instead. In general, the content suggested to the user in selectable options 306 and 308 may be of any type. For example, the selectable option 306 may allow the user to watch a television show available "on-demand," while the selectable option 308 may allow the user to watch a program being broadcast live on a particular channel. In some embodiments, the media guidance application may offer other types of content to the user within the selectable options 304-310. For example, the media guidance application may provide an option to view a television channel, read news articles, browse social media, visit a website available over the Internet, play a game, access an application, browse content available from a streaming service, or access any of the other typical features which may be available to an interactive electronic program guide.

Selectable option 310 is an option to return to a program guide. For example, if the user requested the content from a program guide provided by the media guidance application, the media guidance application may offer the user the opportunity to return to the program guide. In general, the selectable option 310 may allow a user to return to whatever previous activity he or she was involved in prior to requesting the content. For example, if the user was browsing a web page on the Internet and requested the content by clicking on a hyperlink, the selectable option 310 presented by the media guidance application may allow the user to return to the web page he or she was previously browsing. It will be understood that the selectable options 304-310 are intended to be illustrative, and not limiting. In general, display 300 may contain any number of options, and may include other types of options.

FIG. 4 shows an illustrative events database, which may be used in accordance with some embodiments of the disclosure. Database 400 may be an events database configured to store event entries, such as event entries 412-430. Each of event entries 412-430 includes several information fields, each of which corresponds to one of the information fields 402-410. These may include event name information field 402, event ID information field 404, one or more event feature information fields 406, one or more associated event information fields 408, one or more associated purchase code information fields 410, or any type of suitable information field. In general, database 400 may be relational, self-referential, or have any type of internal structure.

Figure 9:
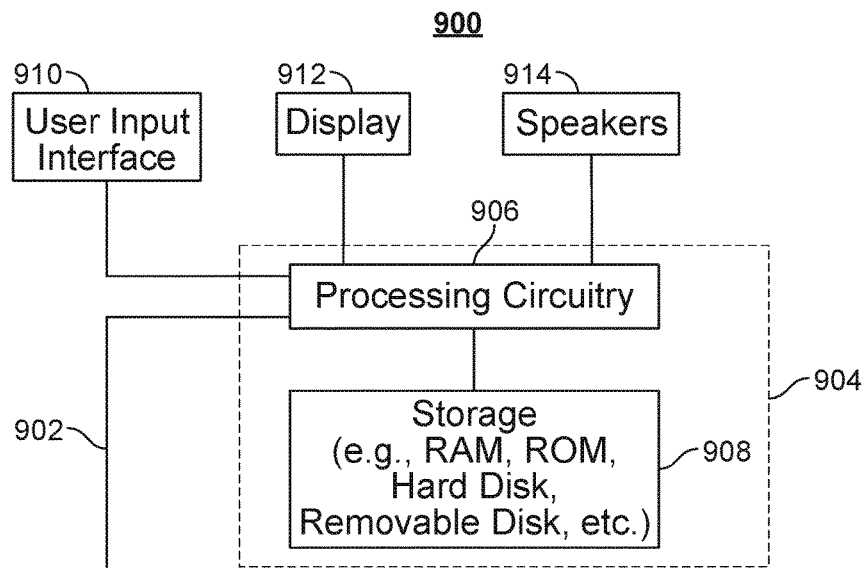
FIG. 9 is a block diagram of an illustrative user equipment device in accordance with some embodiments of the disclosure.

In general, database 400 may be accessed by a media guidance application, and may be used by a media guidance application to identify features of a given event, or other events associated with a given event. In some embodiments, the database 400 may be stored within the memory of a user device (e.g., within storage 908 (FIG. 9). In some embodiments, the database 400 may be a remote database (e.g., stored within media content source 1016 or media guidance data source 1018 (FIG. 10)), which may be accessed over the Internet or a communications network (e.g., over the communications network 1014 (FIG. 10)) using an appropriate API.

Event entries 412-430 include an event name information field 402, and an event identifier (event ID) information field 404. For example, for event entry 412, the event name information field 402 is "Dolly Parton Sings!," and the event ID information field 404 is the alphanumeric identifier "AA123." Each event entry 412-430 may have one or more event feature information fields 406, describing features that appear in the respective event. For example, event feature information fields 406 for event entry 412 indicate that the associated event is a "Live Event," a "Music Concert" event, and a "Genre: Country" event. In general, a media guidance application may search for event entries 412-430 that have a particular type of feature listed in one of the event feature information fields 406. The media guidance application may also search for commonality in the event feature information fields 406 for different event entries 412-430 in order to find events that share features in common.

Event entries 412-430 may have any number of associated event information fields 408 that identify other related events. For illustrative purposes, database 400 depicts associated event information field 408 referring to the associated events by use of an event ID (e.g., the event ID listed in the event ID information fields 404), but any convenient means may be used to refer to the related events within the database 400. For example, event entry 412 for the event entitled "Dolly Parton Sings!" has associated event information fields 408 listing event ID "BB234" corresponding to the event associated with event entry 412 entitled "Jack White Croons!," and event ID "CC345" corresponding to the event associated with the event entry 416 entitled "9 to 5." In general, a media guidance application may access data for any of the event entries 412-430, and use the associated event information fields 408 to quickly identify other associated events and the respective event entries 412-430 for those associated events.

Event entries 412-430 may have any number of associated purchase code information fields 410 that identify purchase codes for purchases related to the events. Each of the purchase codes in the associated purchase code information fields 410 may be associated with one or more user purchase activities. The media guidance application may use the purchase codes in conjunction with a purchase activity database (e.g., database 600 (FIG. 6)) in order to look up additional information about a purchase. This may include information about different types of events associated with purchase that corresponds to a given purchase code.

It will be understood that the information fields 402-410 in database 400 are intended to be illustrative, and not limiting. In some embodiments, the database 400 may include event entries with any number of information fields, and the information fields may generally contain any type of data other than the ones described by the information fields 402-410. In some embodiments, there may be an information field containing a brief description of the event, an information field listing content (e.g., media assets) associated with the event, an information field containing links to related websites, an information field logging user activities related to the event, or any other type of information field. For example, a media guidance application may access one of the event entries 412-430 and identify content associated with a respective one of the event entries. The media guidance application may then find additional information about each of the content listed in the event entries 412-430, for example, by making use of a content database (e.g., database 500 (FIG. 5)), or media guidance data source (e.g., media guidance data source 1018 (FIG. 10)).

FIG. 5 shows an illustrative content database, which may be used in accordance with some embodiments of the disclosure. For illustrative purposes, database 500 is depicted as storing information about various types of media content. However, database 500 may be configured to store information about any type of content, including media, multimedia, movies, games, or events. Database 500 is configured to content entries 514-520. Each of the content entries 514-520 includes several information fields 502-512. These may include content title fields 502, content identifier (content ID) fields 504, keyword fields 506, description fields 508, associated content fields 510, spoiler flag fields 512, or any other type of suitable information fields. The database 500 may also contain other general metadata for each of the content associated with content entries 514-520, and which may be stored in one or more of the information fields of a given entry. In general, database 500 may be relational, self-referential, or have any type of internal structure.

In general, database 500 may be accessed by a media guidance application, and may be used by a media guidance application to look up information about different media assets, events, or other types of content. In some embodiments, the database 500 may be stored within the memory of a user device (e.g., within storage 908 (FIG. 9). In some embodiments, the database 500 may be a remote database (e.g., stored within media content source 1016 or media guidance data source 1018 (FIG. 10)), which may be accessed over the Internet or a communications network (e.g., over the communications network 1014 (FIG. 10)) using an appropriate API.

Content entries 514-520 include a content title field 502, and a content ID field 504. For example, for content entry 514, the content title field 502 is "The Walking Dead Future Episode," and the content ID field 504 is the unique alphanumeric identifier "QQ789." Each of the content entries 514-520 may have one or more keyword fields 506. For example, the keyword fields 506 for content entry 514 include the keywords "New Show," "Genre: Horror," and "Zombie Themed." Each of the content entries 514-520 may also include a description field 508, which may generally describe the content associated with each of the given content entries 514-520.

Each of the content entries 514-520 may have one or more associated content fields 510, and corresponding spoiler flag fields 512 indicating whether or not the content associated with a given entry contains a spoiler for the associated content listed in the database 500. For illustrative purposes, database 500 depicts associated content fields 510 referring to the associated content by use of a content ID (e.g., the content ID listed in the content ID fields 504), but any convenient means may be used to refer to the associated content within the database 500. For example, content entry 514 for the television program "The Walking Dead Future Episode" has an associated content field 510 for content ID "RR123" corresponding to television program "The Walking Dead Recap Show" associated with content entry 516. Additionally, the corresponding spoiler flag field 512 indicates that the television program "The Walking Dead Future Episode" has "No" spoilers for the television program "The Walking Dead Recap Show" associated with content entry 516. By comparison, content entry 514 for the television program "The Walking Dead Future Episode" indicates that the television program "The Walking Dead Future Episode" does contain spoilers for the television program "The Walking Dead Season Premiere" corresponding to content ID "WW234" and associated with content entry 518.

By checking the associated content fields 510 and spoiler flag fields 512, a media guidance application may easily look up a given content entry 514-520 in the database 500 and quickly determine whether or not a given content contains a spoiler for another content. In general, database 500 may be used to store information about any type of content associated with a given content, and store information about whether or not there is a spoiler for that content contained in the content. For example, in some embodiments the associated content fields 510 may be replaced or supplemented by associated content information fields, which may be used to track any type of associated content such as books, videos, periodicals, multimedia, movies, games, or events, as well as whether or not a given content contains spoilers for the associated content.

It is understood that the information fields 502-512 are intended to be illustrative, and not limiting. In some embodiments, the database 500 may include entries with any number of information fields, and the information fields may generally contain any type of data other than the ones described by the information fields 502-512. Additionally, some or all of the database 500 may be combined with some or all of the database 400 (FIG. 4), and the general techniques and types of information fields used in connection with database 500 may be applied to any other database, including database 400. For example, a media guidance application may identify one or more events associated with a given content entry within database 500, and determine if the content contains a spoiler for a given event. As another example, a media guidance application may search for events ID's associated with a given purchase code by searching the purchase code information fields 410 of the event entries 412-430 in database 400 (FIG. 4), use the event ID's to search for content entries 514-520 in database 500 (FIG. 5) that are associated with the identified event ID's, and determine if the associated content contains spoilers for any events associated with those event ID's.

FIG. 6 shows an illustrative purchase activity database, which may be used in accordance with some embodiments of the disclosure. Database 600 may be a purchase activity database configured to store information about purchases, such as purchase entries 612-616. Each of the purchase entries 612-616 includes several information fields, each of which corresponds to one of the information fields 602-610. These may include purchase code fields 602, purchase source fields 604, associated event fields 606, event ID fields 608, a purchase description field 610, or any type of suitable information field. In general, database 600 may be relational, self-referential, or have any type of internal structure.

In general, database 600 may be accessed by a media guidance application, and may be used by a media guidance application to look up information about different types of purchases. In some embodiments, the database 600 may be stored within the memory of a user device (e.g., within storage 908 (FIG. 9). In some embodiments, the database 600 may be a remote database (e.g., stored within media content source 1016 or media guidance data source 1018 (FIG. 10)), which may be accessed over the Internet or a communications network (e.g., over the communications network 1014 (FIG. 10)) using an appropriate API.

Purchase entries 612-616 include a purchase code field 602. Each of purchase code field 602 may contain a unique alphanumeric purchase code identifying the item that was purchased. In general, the media guidance application may generate the purchase codes based on purchase information received from venders, or the venders may provide purchase codes directly to the media guidance application. Purchase entries 612-616 also include a purchase source field 604, indicating where an item was purchased from, and a purchase description field 610, describing the purchase. For example, the purchase associated with purchase entry 612 in the database 600 was a live event ticket "Multi-Day Dolly Parton Tour Pass" purchased from the vendor "TicketMaster."

Each purchase entry 612-616 includes one or more associated event fields 606, and corresponding event ID fields 608, listing events that are associated with a given purchase. For example, for purchase entry 612 corresponding to a live event ticket "Multi-Day Dolly Parton Tour Pass," one of the associated events is the concert "Dolly Parton Sings!," which may also be identified by the corresponding event ID "AA123." In general, the format of the event ID's stored in the event ID fields 608 may match the format used in the database 400, and the media guidance application may use an event ID retrieved from the database 600 to look up information about an event associated with a given purchase using database 400, or any other type of suitable database.

It is understood that the information fields 602-610 are intended to be illustrative, and not limiting. In some embodiments, the database 600 may include purchase entries with any number of information fields, and the information fields may generally contain any type of data other than the ones described by the information fields 602-610. Additionally, some or all of the database 600 may be combined with some or all of databases 400 (FIG. 4) or 500 (FIG. 5), and the general techniques and types of information fields used in connection with database 600 may be applied to any other database, including database 400 and database 500. For example, a media guidance application may identify one or more events associated with a given purchase entry within database 600, and, using the event ID for the associated event to search the entries within database 500, determine if any of the content contain spoilers for associated event.

Figure 7:
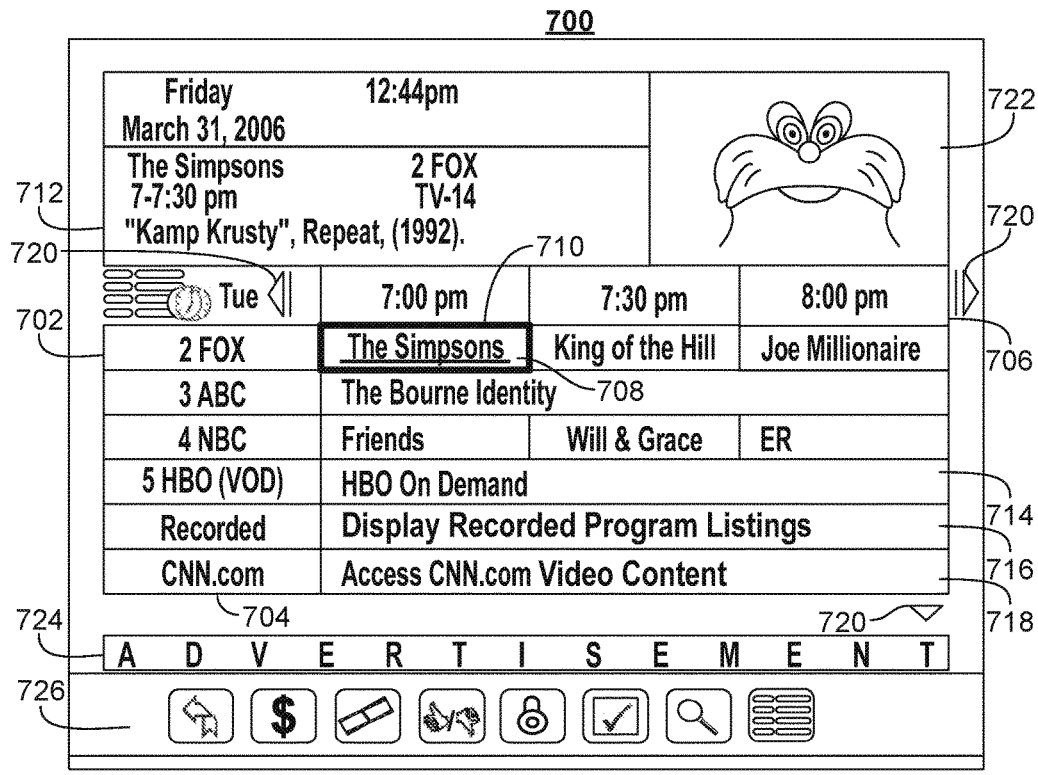
FIG. 7 shows an illustrative example of a display screen for use in accessing media content in accordance with some embodiments of the disclosure.
Figure 8:
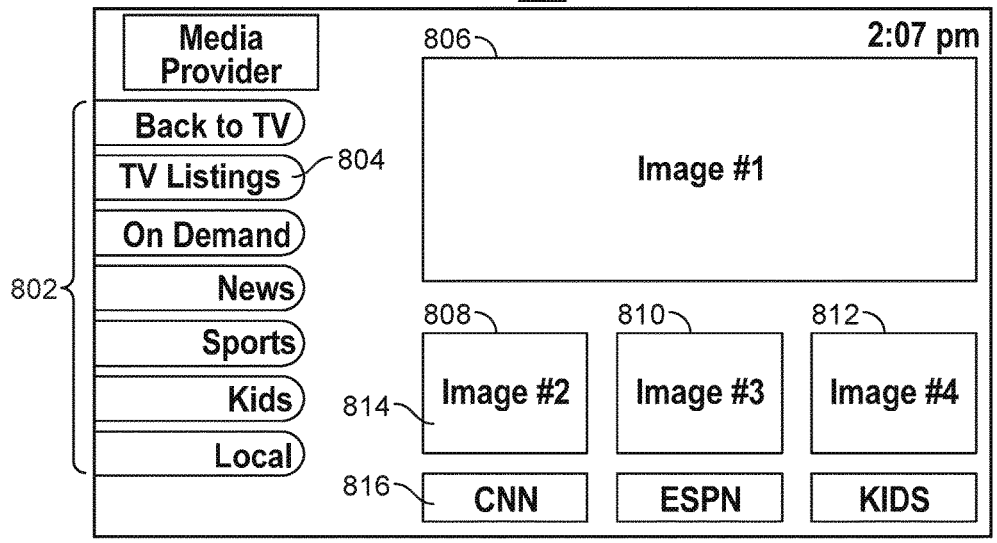
FIG. 8 shows another illustrative example of a display screen used to access media content in accordance with some embodiments of the disclosure.

FIGS. 7-8 show illustrative display screens that may be used to provide media guidance data. The display screens shown in FIGS. 7-8 may be implemented on any suitable user equipment device or platform. While the displays of FIGS. 7-8 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 7 shows illustrative grid of a program listings display 700 arranged by time and channel that also enables access to different types of content in a single display. Display 700 may include grid 702 with: (1) a column of channel/content type identifiers 704, where each channel/content type identifier (which is a cell in the column) identifies a different channel or content type available; and (2) a row of time identifiers 706, where each time identifier (which is a cell in the row) identifies a time block of programming. Grid 702 also includes cells of program listings, such as program listing 708, where each listing provides the title of the program provided on the listing's associated channel and time. With a user input device, a user can select program listings by moving highlight region 710. Information relating to the program listing selected by highlight region 710 may be provided in program information region 712. Region 712 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 702 may provide media guidance data for non-linear programming including on-demand listing 714, recorded content listing 716, and Internet content listing 718. A display combining media guidance data for content from different types of content sources is sometimes referred to as a "mixed-media" display. Various permutations of the types of media guidance data that may be displayed that are different than display 700 may be based on user selection or guidance application definition (e.g., a display of only recorded and broadcast listings, only on-demand and broadcast listings, etc.). As illustrated, listings 714, 716, and 718 are shown as spanning the entire time block displayed in grid 702 to indicate that selection of these listings may provide access to a display dedicated to on-demand listings, recorded listings, or Internet listings, respectively. In some embodiments, listings for these content types may be included directly in grid 702. Additional media guidance data may be displayed in response to the user selecting one of the navigational icons 720. (Pressing an arrow key on a user input device may affect the display in a similar manner as selecting navigational icons 720.)

Display 700 may also include video region 722, advertisement 724, and options region 726. Video region 722 may allow the user to view and/or preview programs that are currently available, will be available, or were available to the user. The content of video region 722 may correspond to, or be independent from, one of the listings displayed in grid 702. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 724 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 702. Advertisement 724 may also be for products or services related or unrelated to the content displayed in grid 702. Advertisement 724 may be selectable and provide further information about content, provide information about a product or a service, enable purchasing of content, a product, or a service, provide content relating to the advertisement, etc. Advertisement 724 may be targeted based on a user's profile/preferences, monitored user activity, the type of display provided, or on other suitable targeted advertisement bases.

While advertisement 724 is shown as rectangular or banner shaped, advertisements may be provided in any suitable size, shape, and location in a guidance application display. For example, advertisement 724 may be provided as a rectangular shape that is horizontally adjacent to grid 702. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 726 may allow the user to access different types of content, media guidance application displays, and/or media guidance application features. Options region 726 may be part of display 700 (and other display screens described herein), or may be invoked by a user by selecting an on-screen option or pressing a dedicated or assignable button on a user input device. The selectable options within options region 726 may concern features related to program listings in grid 702 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 10. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 8. Video mosaic display 800 includes selectable options 802 for content information organized based on content type, genre, and/or other organization criteria. In display 800, television listings option 804 is selected, thus providing listings 806, 808, 810, and 812 as broadcast program listings. In display 800 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 808 may include more than one portion, including media portion 814 and text portion 816. Media portion 814 and/or text portion 816 may be selectable to view content in full-screen or to view information related to the content displayed in media portion 814 (e.g., to view listings for the channel that the video is displayed on).

The listings in display 800 are of different sizes (i.e., listing 806 is larger than listings 808, 810, and 812), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 9 shows a generalized embodiment of illustrative user equipment device 900. More specific implementations of user equipment devices are discussed below in connection with FIG. 10. User equipment device 900 may receive content and data via input/output (hereinafter "I/O") path 902. I/O path 902 may provide content (e.g., broadcast programming, on-demand programming, Internet content, content available over a local area network (LAN) or wide area network (WAN), and/or other content) and data to control circuitry 904, which includes processing circuitry 906 and storage 908. Control circuitry 904 may be used to send and receive commands, requests, and other suitable data using I/O path 902. I/O path 902 may connect control circuitry 904 (and specifically processing circuitry 906) to one or more communications paths (described below). I/O functions may be provided by one or more of these communications paths, but are shown as a single path in FIG. 9 to avoid overcomplicating the drawing.

Control circuitry 904 may be based on any suitable processing circuitry such as processing circuitry 906. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 904 executes instructions for a media guidance application stored in memory (i.e., storage 908). Specifically, control circuitry 904 may be instructed by the media guidance application to perform the functions discussed above and below. For example, the media guidance application may provide instructions to control circuitry 904 to generate the media guidance displays. In some implementations, any action performed by control circuitry 904 may be based on instructions received from the media guidance application.

In client-server based embodiments, control circuitry 904 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 10). In addition, communications circuitry may include circuitry that enables peer-to-peer communication of user equipment devices, or communication of user equipment devices in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as media guidance data described above. Nonvolatile memory may also be used (e.g., to launch a boot-up routine and other instructions). Cloud-based storage, described in relation to FIG. 10, may be used to supplement storage 908 or instead of storage 908.

Control circuitry 904 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 904 may also include scaler circuitry for upconverting and downconverting content into the preferred output format of the user equipment 900. Circuitry 904 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment 900, the tuning and encoding circuitry (including multiple tuners) may be associated with storage 908.

A user may send instructions to control circuitry 904 using user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of user equipment device 900. For example, display 912 may be a touchscreen or touch-sensitive display. In such circumstances, user input interface 910 may be integrated with or combined with display 912. Display 912 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 912 may be HDTV-capable. In some embodiments, display 912 may be a 3D display, and the interactive media guidance application and any suitable content may be displayed in 3D. A video card or graphics card may generate the output to the display 912. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 904. The video card may be integrated with the control circuitry 904. Speakers 914 may be provided as integrated with other elements of user equipment device 900 or may be stand-alone units. The audio component of videos and other content displayed on display 912 may be played through speakers 914. In some embodiments, the audio may be distributed to a receiver (not shown), which processes and outputs the audio via speakers 914.

The guidance application may be implemented using any suitable architecture. For example, it may be a stand-alone application wholly-implemented on user equipment device 900. In such an approach, instructions of the application are stored locally (e.g., in storage 908), and data for use by the application is downloaded on a periodic basis (e.g., from an out-of-band feed, from an Internet resource, or using another suitable approach). Control circuitry 904 may retrieve instructions of the application from storage 908 and process the instructions to generate any of the displays discussed herein. Based on the processed instructions, control circuitry 904 may determine what action to perform when input is received from input interface 910. For example, movement of a cursor on a display up/down may be indicated by the processed instructions when input interface 910 indicates that an up/down button was selected.

In some embodiments, the media guidance application is a client-server based application. Data for use by a thick or thin client implemented on user equipment device 900 is retrieved on-demand by issuing requests to a server remote to the user equipment device 900. In one example of a client-server based guidance application, control circuitry 904 runs a web browser that interprets web pages provided by a remote server. For example, the remote server may store the instructions for the application in a storage device. The remote server may process the stored instructions using circuitry (e.g., control circuitry 904) and generate the displays discussed above and below. The client device may receive the displays generated by the remote server and may display the content of the displays locally on equipment device 900. This way, the processing of the instructions is performed remotely by the server while the resulting displays are provided locally on equipment device 900. Equipment device 900 may receive inputs from the user via input interface 910 and transmit those inputs to the remote server for processing and generating the corresponding displays. For example, equipment device 900 may transmit a communication to the remote server indicating that an up/down button was selected via input interface 910. The remote server may process instructions in accordance with that input and generate a display of the application corresponding to the input (e.g., a display that moves a cursor up/down). The generated display is then transmitted to equipment device 900 for presentation to the user.

In some embodiments, the media guidance application is downloaded and interpreted or otherwise run by an interpreter or virtual machine (run by control circuitry 904). In some embodiments, the guidance application may be encoded in the ETV Binary Interchange Format (EBIF), received by control circuitry 904 as part of a suitable feed, and interpreted by a user agent running on control circuitry 904. For example, the guidance application may be an EBIF application. In some embodiments, the guidance application may be defined by a series of JAVA-based files that are received and run by a local virtual machine or other suitable middleware executed by control circuitry 904. In some of such embodiments (e.g., those employing MPEG-2 or other digital media encoding schemes), the guidance application may be, for example, encoded and transmitted in an MPEG-2 object carousel with the MPEG audio and video packets of a program.

Figure 10:
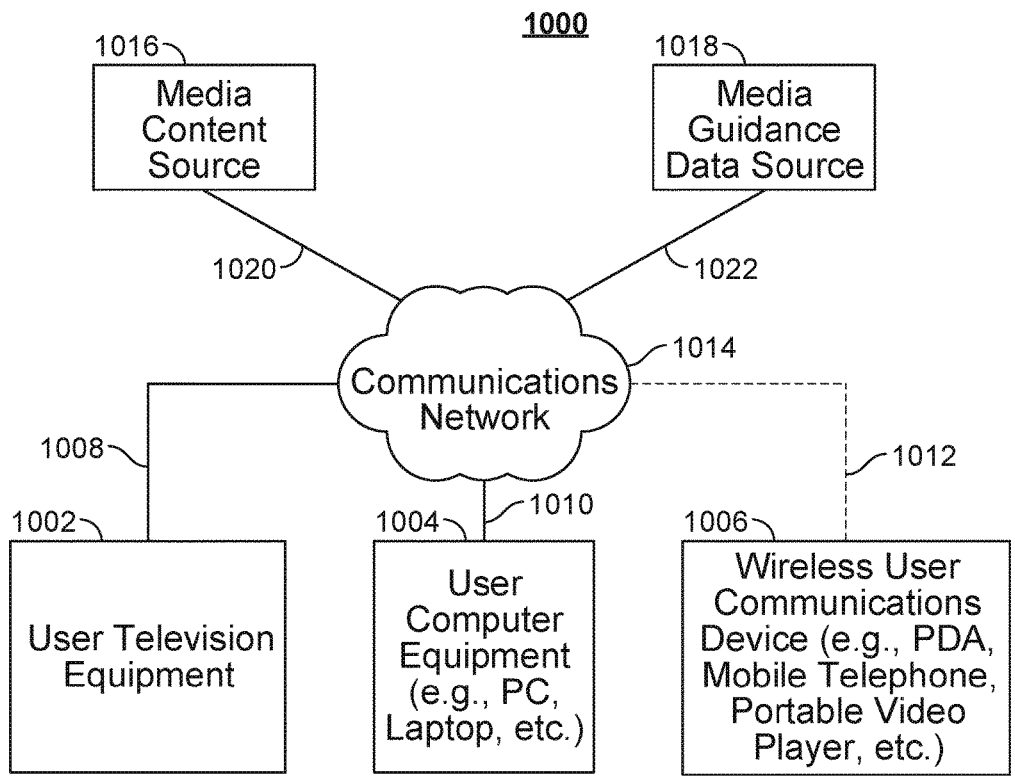
FIG. 10 is a block diagram of an illustrative media system in accordance with some embodiments of the disclosure.

User equipment device 900 of FIG. 9 can be implemented in system 1000 of FIG. 10 as user television equipment 1002, user computer equipment 1004, wireless user communications device 1006, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 9 may not be classified solely as user television equipment 1002, user computer equipment 1004, or a wireless user communications device 1006. For example, user television equipment 1002 may, like some user computer equipment 1004, be Internet-enabled allowing for access to Internet content, while user computer equipment 1004 may, like some user television equipment 1002, include a tuner allowing for access to television programming. The media guidance application may have the same layout on various different types of user equipment or may be tailored to the display capabilities of the user equipment. For example, on user computer equipment 1004, the guidance application may be provided as a web site accessed by a web browser. In another example, the guidance application may be scaled down for wireless user communications devices 1006.

In system 1000, there is typically more than one of each type of user equipment device but only one of each is shown in FIG. 10 to avoid overcomplicating the drawing. In addition, each user may utilize more than one type of user equipment device and also more than one of each type of user equipment device.

In some embodiments, a user equipment device (e.g., user television equipment 1002, user computer equipment 1004, wireless user communications device 1006) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1014. Namely, user television equipment 1002, user computer equipment 1004, and wireless user communications device 1006 are coupled to communications network 1014 via communications paths 1008, 1010, and 1012, respectively. Communications network 1014 may be one or more networks including the Internet, a mobile phone network, mobile voice or data network (e.g., a 4G or LTE network), cable network, public switched telephone network, or other types of communications network or combinations of communications networks. Paths 1008, 1010, and 1012 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1012 is drawn with dotted lines to indicate that in the exemplary embodiment shown in FIG. 10 it is a wireless path and paths 1008 and 1010 are drawn as solid lines to indicate they are wired paths (although these paths may be wireless paths, if desired). Communications with the user equipment devices may be provided by one or more of these communications paths, but are shown as a single path in FIG. 10 to avoid overcomplicating the drawing.

Although communications paths are not drawn between user equipment devices, these devices may communicate directly with each other via communication paths, such as those described above in connection with paths 1008, 1010, and 1012, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1014.

System 1000 includes content source 1016 and media guidance data source 1018 coupled to communications network 1014 via communication paths 1020 and 1022, respectively. Paths 1020 and 1022 may include any of the communication paths described above in connection with paths 1008, 1010, and 1012. Communications with the content source 1016 and media guidance data source 1018 may be exchanged over one or more communications paths, but are shown as a single path in FIG. 10 to avoid overcomplicating the drawing. In addition, there may be more than one of each of content source 1016 and media guidance data source 1018, but only one of each is shown in FIG. 10 to avoid overcomplicating the drawing. (The different types of each of these sources are discussed below.) If desired, content source 1016 and media guidance data source 1018 may be integrated as one source device. Although communications between sources 1016 and 1018 with user equipment devices 1002, 1004, and 1006 are shown as through communications network 1014, in some embodiments, sources 1016 and 1018 may communicate directly with user equipment devices 1002, 1004, and 1006 via communication paths (not shown) such as those described above in connection with paths 1008, 1010, and 1012.

System 1000 may also include an advertisement source 1024 coupled to communications network 1014 via a communications path 1026. Path 1026 may include any of the communication paths described above in connection with paths 1008, 1010, and 1012. Advertisement source 1024 may include advertisement logic to determine which advertisements to transmit to specific users and under which circumstances. For example, a cable operator may have the right to insert advertisements during specific time slots on specific channels. Thus, advertisement source 1024 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 1024 may be configured to maintain user information including advertisement-suitability scores associated with user in order to provide targeted advertising. Additionally or alternatively, a server associated with advertisement source 1024 may be configured to store raw information that may be used to derive advertisement-suitability scores. In some embodiments, advertisement source 1024 may transmit a request to another device for the raw information and calculate the advertisement-suitability scores. Advertisement source 1024 may update advertisement-suitability scores for specific users (e.g., first subset, second subset, or third subset of users) and transmit an advertisement of the target product to appropriate users.

Content source 1016 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1016 may be the originator of content (e.g., a television broadcaster, a Webcast provider, etc.) or may not be the originator of content (e.g., an on-demand content provider, an Internet provider of content of broadcast programs for downloading, etc.). Content source 1016 may include cable sources, satellite providers, on-demand providers, Internet providers, over-the-top content providers, or other providers of content. Content source 1016 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1018 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1018 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1018 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1018 may provide user equipment devices 1002, 1004, and 1006 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 908, and executed by control circuitry 904 of a user equipment device 900. In some embodiments, media guidance applications may be client-server applications where only a client application resides on the user equipment device, and server application resides on a remote server. For example, media guidance applications may be implemented partially as a client application on control circuitry 904 of user equipment device 900 and partially on a remote server as a server application (e.g., media guidance data source 1018) running on control circuitry of the remote server. When executed by control circuitry of the remote server (such as media guidance data source 1018), the media guidance application may instruct the control circuitry to generate the guidance application displays and transmit the generated displays to the user equipment devices. The server application may instruct the control circuitry of the media guidance data source 1018 to transmit data for storage on the user equipment. The client application may instruct control circuitry of the receiving user equipment to generate the guidance application displays.

Content and/or media guidance data delivered to user equipment devices 1002, 1004, and 1006 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1000 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 10.

In one approach, user equipment devices may communicate with each other within a home network. User equipment devices can communicate with each other directly via short-range point-to-point communication schemes described above, via indirect paths through a hub or other similar device provided on a home network, or via communications network 1014. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1016 to access content. Specifically, within a home, users of user television equipment 1002 and user computer equipment 1004 may access the media guidance application to navigate among and locate desirable content. Users may also access the media guidance application outside of the home using wireless user communications devices 1006 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1014. These cloud resources may include one or more content sources 1016 and one or more media guidance data sources 1018. In addition or in the alternative, the remote computing sites may include other user equipment devices, such as user television equipment 1002, user computer equipment 1004, and wireless user communications device 1006. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1004 or wireless user communications device 1006 having content capture feature. Alternatively, the user can first transfer the content to a user equipment device, such as user computer equipment 1004. The user equipment device storing the content uploads the content to the cloud using a data transmission service on communications network 1014. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 9.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 11:
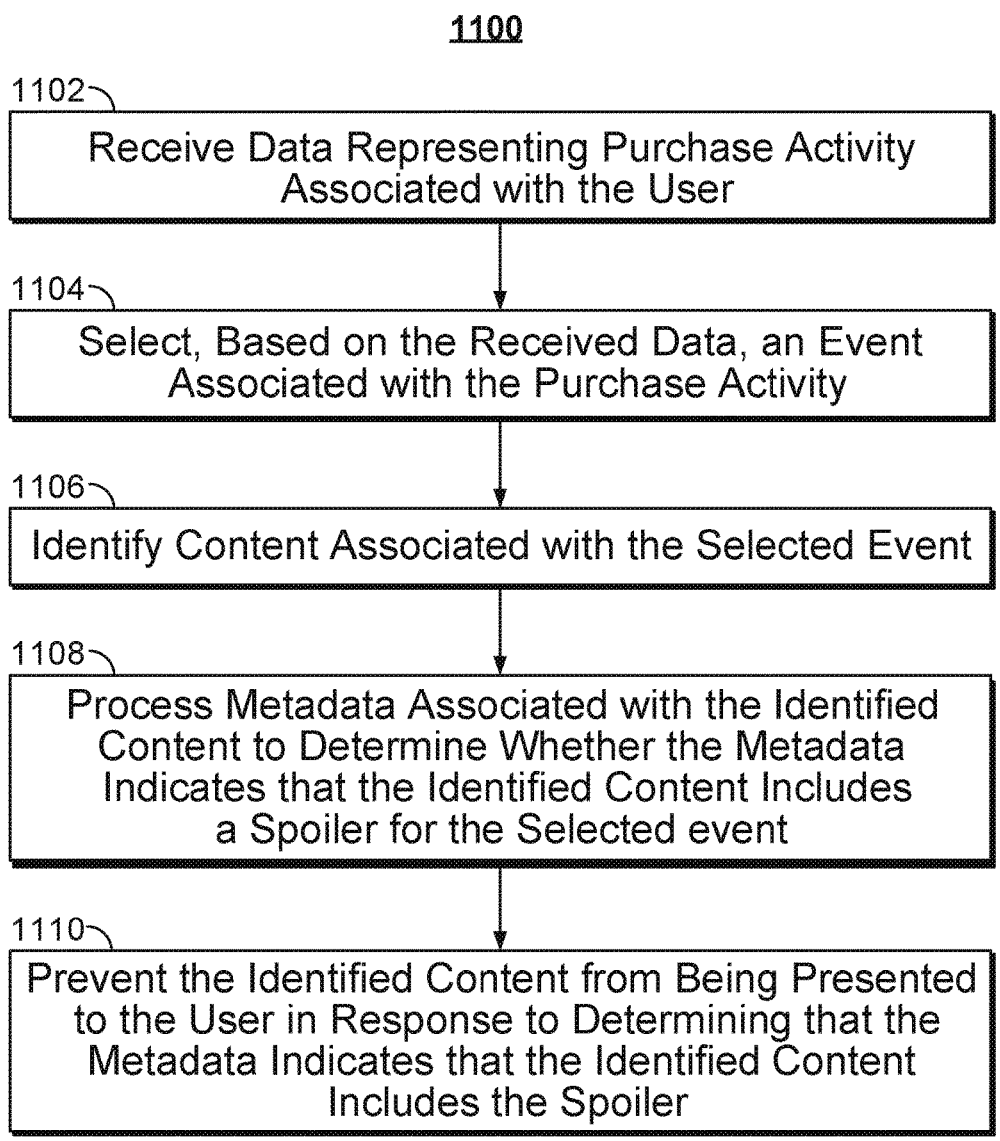
FIG. 11 is a flowchart of illustrative steps for preventing a spoiler from being presented to a user based on a purchase activity, in accordance with some embodiments of the disclosure.

FIG. 11 is a flowchart of illustrative steps for preventing a spoiler from being presented to a user based on a purchase activity, in accordance with some embodiments of the disclosure. For example, a media guidance application implementing process 1100 may be executed by control circuitry 904 (FIG. 9). It should be noted that process 1100 or any portion thereof could be performed on, or be provided by, any of the devices discussed in relation to FIG. 9 or FIG. 10, and utilize any of the databases discussed in relation to FIGS. 4-6. It should also be noted that process 1100 or any of the individual procedures discussed in relation to process 1100 may be combined with any of the other processes in this disclosure, including the processes discussed in relation to FIGS. 12-18.

Process 1100 begins at 1102, where the media guidance application receives (e.g., via control circuitry 904 (FIG. 9)) data representing purchase activity associated with a user. For example, the media guidance application may receive (e.g., via control circuitry 904 (FIG. 9)) data from an online vender over a communications network (e.g., via communications network 1014 (FIG. 10)) describing a user purchase. In some embodiments, the received data may include a purchase description, a purchase price, a purchase source, or a purchase code which may be used by the media guidance application to search a purchases database (e.g., database 600 (FIG. 6)).

Process 1100 continues to 1004, where the media guidance application selects (e.g., via control circuitry 904 (FIG. 9)), based on the received data, an event associated with the purchase activity. In general, the media guidance application may receive data that includes a purchase description, a purchase price, a purchase source, a purchase code, or other information that may be used to search a database (e.g., database 600 (FIG. 6)) and identify events associated with the purchase activity represented by the received data. The media guidance application may then select one of the identified events associated with the purchase activity from the purchases database. For example, if the media guidance application searches database 600 (FIG. 6) with the purchase code "SCI76" corresponding to purchase entry 614 (FIG. 6) for the live event ticket "General Admission for Evil Dead with Walking Dead Sneak Peek," the media guidance application may select the event entitled "The Walking Dead Season Premiere" from one of the associated events fields 606 of purchase entry 614.

Process 1100 continues to 1006, where the media guidance application identifies (e.g., via control circuitry 904 (FIG. 9)) content associated with the selected event. In general, the media guidance application may use the name of the selected event or an identifier for the selected event to search a database (e.g., the databases 400 (FIG. 4) or 500 (FIG. 5)) and identify content associated with the given event. For example, the media guidance application may accomplish this by searching a version of database 500 (FIG. 5) that includes content entries 514-520 representing events, and list media assets, events, or other content associated with the events represented by content entries 514-520. In this case, the media guidance application may use the name of the selected event (e.g., the title of the event "The Walking Dead Season Premiere") or an identification code for the selected event (e.g., event ID "FF789") to search for matching content entries 514-520 in database 500, and identify the content associated with the selected event using the associated content fields 510 for the matching database entries.

Process 1100 continues to 1008, where the media guidance application processes (e.g., via control circuitry 904 (FIG. 9)) metadata associated with the identified content to determine whether the metadata indicates that the identified content includes a spoiler for the selected event. For example, the media guidance application may search a content database (e.g., database 500 (FIG. 5)) for metadata indicating whether or not the content contains spoilers for the selected event. In this case, the media guidance application may search the database 500 (FIG. 5) for metadata associated with the television program "The Walking Dead Recap Show," which the database 500 indicates is associated with the television program "The Walking Dead Season Premiere," and determine from the spoiler flag fields 512 for content entry 516 that the television program "The Walking Dead Recap Show" does contain spoilers for the television program "The Walking Dead Season Premiere." Other techniques for processing metadata and determining whether metadata indicates that identified content contains spoilers, which may be used in conjunction with some embodiments of process 1100, are discussed in relation to FIG. 17.

Process 1100 continues to 1010, where the media guidance application prevents (e.g., via control circuitry 904 (FIG. 9)) the identified content from being presented to the user in response to determining that the metadata indicates that the identified content includes the spoiler. For example, in response to determining that the television program "The Walking Dead Recap Show" does contain spoilers for the television program "The Walking Dead Season Premiere," which in turn was associated with the original user purchase activity, the media guidance application may prevent the television program "The Walking Dead Recap Show" from being displayed to the user. The media guidance application may prevent the content from being presented any number of ways. For example, the media guidance application may refuse to display the television program "The Walking Dead Recap Show," and display some type of alternate content instead if the user attempts to access the television program "The Walking Dead Recap Show." As another example, the media guidance application may prevent the television program "The Walking Dead Recap Show" from being displayed within a program listings display (e.g., program listings display 700 (FIG. 7)), thereby removing the ability of the user to request access to the content from within the program listings display. In some embodiments, the media guidance application may also use one of the techniques for preventing content from being presented to the user discussed in relation to FIGS. 1-3 as part of process 1100.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. For example, a media guidance application may identify content associated with a selected event at 1106 by use of metadata, while simultaneously processing the metadata to determine whether the content includes spoilers at 1108. This may reduce the total amount of time needed to perform process 1100. Furthermore, it should be noted that any of the devices or equipment discussed in relation to FIG. 9 or FIG. 10 or the databases discussed in relation to FIGS. 4-6 could be used to perform one or more of the steps in FIG. 11.

Figure 12:
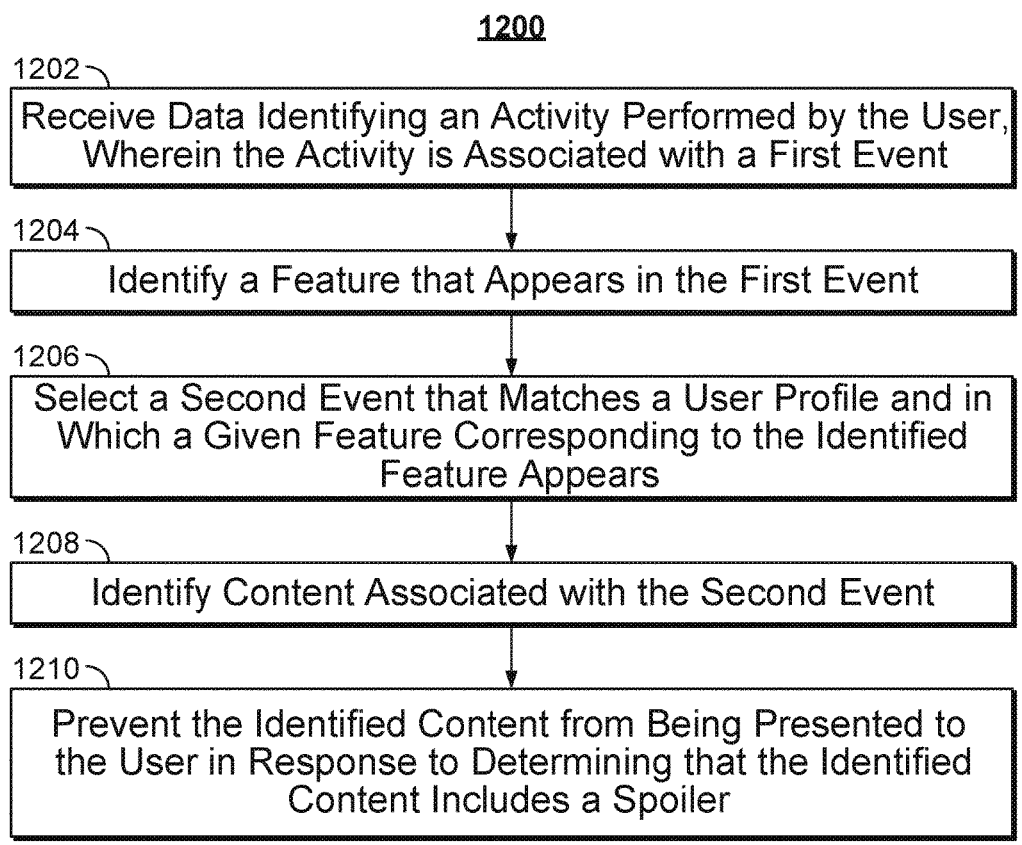
FIG. 12 is a flowchart of illustrative steps for preventing a spoiler from being presented to a user based on an activity, in accordance with some embodiments of the disclosure.

FIG. 12 is a flowchart of illustrative steps for preventing a spoiler from being presented to a user based on an activity, in accordance with some embodiments of the disclosure. For example, a media guidance application implementing process 1200 may be executed by control circuitry 904 (FIG. 9). It should be noted that process 1200 or any portion thereof could be performed on, or be provided by, any of the devices discussed in relation to FIG. 9 or FIG. 10, and utilize any of the databases discussed in relation to FIGS. 4-6. It should also be noted that process 1200 or any of the individual procedures discussed in relation to process 1200 may be combined with any of the other processes in this disclosure, including the processes discussed in relation to FIG. 11 or FIGS. 13-18.

Process 1200 begins at 1202, where the media guidance application receives (e.g., via control circuitry 904 (FIG. 9)) data identifying an activity performed by the user, wherein the activity is associated with a first event. For example, the media guidance application may receive data indicating that the user made a purchase which is associated with a first event, data indicating that the user accessed a television show or scheduled a recording for a media asset which is associated with a first event, data indicating that the user communicated on social media about a first event, or any type of suitable data indicating a user activity. For instance, the media guidance application may receive data indicating that the user communicated on social media about an upcoming event, a broadcast of the television program episode entitled "The Walking Dead Season Premiere."

Process 1200 continues to 1204, where the media guidance application identifies (e.g., via control circuitry 904 (FIG. 9)) a feature that appears in the first event. In general, a media guidance application may identify the feature by first looking up the event in an events database (e.g., database 400 (FIG. 4)) that lists features associated with each event. For example, the media guidance application may query database 400 (FIG. 4) for event feature information fields 406 for event entries 412-430 within database 400 that match name of the event entitled "The Walking Dead Season Premiere." In this case, the database will return the event feature information fields 406 for event entry 422, which includes the features "Scheduled Broadcast," "Genre: Horror," and "Zombie Themed." The media guidance application may then use one of these features (e.g., the feature "Zombie Themed") as the identified feature associated with the event entitled "The Walking Dead Season Premiere."

Process 1200 continues to 1206, where the media guidance application selects (e.g., via control circuitry 904 (FIG. 9)) a second event that matches a user profile and in which a given feature corresponding to the identified feature appears. For example, the media guidance application may use an events database (e.g., database 400 (FIG. 4)) to identify other events where the identified feature appears, and select one of the identified events that matches user preferences listed inside of a user profile. For instance, if the media guidance application searches the database 400 (FIG. 4) for other events that include the feature "Zombie Themed," the media guidance application may identify event entries 424-430 for the events entitled "The Walking Dead Recap Show," "The Walking Dead Premiere Rerun," "Evil Dead!," and "See Evil Dead with Tom." The media guidance application may then use the user profile and determine that the user has a preference for events that include the feature "Live Event," and select entry 428 for the event entitled "Evil Dead!" as the second event that matches the user profile and is associated with the given feature "Zombie Themed."

Process 1200 continues to 1208, where the media guidance application identifies (e.g., via control circuitry 904 (FIG. 9)) content associated with the second event. In general, the media guidance application may use the name of the selected event or an identifier for the selected event to search a database (e.g., the databases 400 (FIG. 4) or 500 (FIG. 5)) and identify content associated with the given event. For example, media guidance application may accomplish this by searching a version of database 500 (FIG. 5) that includes entries representing events, and list media assets, events, or other content associated with the events represented by entries.

Process 1200 continues to 1210, where the media guidance application prevents (e.g., via control circuitry 904 (FIG. 9)) the identified content from being presented to the user in response to determining that the identified content includes a spoiler. For example, the media guidance application may analyze metadata for the identified content to determine if the identified content contains a spoiler for the second event. The media guidance application may then prevent (e.g., via control circuitry 904 (FIG. 9)) the identified content from being presented to the user in response to determining that it does contain the spoiler. This may be done any number of ways. For example, the media guidance application may prevent the identified content from being displayed to a user, the media guidance application may display alternate content to the user in the place of the identified content, or any other suitable method may be used to prevent the identified content from being displayed. In some embodiments, the media guidance application may also use one of the techniques for preventing content from being presented to the user discussed in relation to FIGS. 1-3 as part of process 1200.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 9 or FIG. 10 or the databases discussed in relation to FIGS. 4-6 could be used to perform one or more of the steps in FIG. 12.

Figure 13:
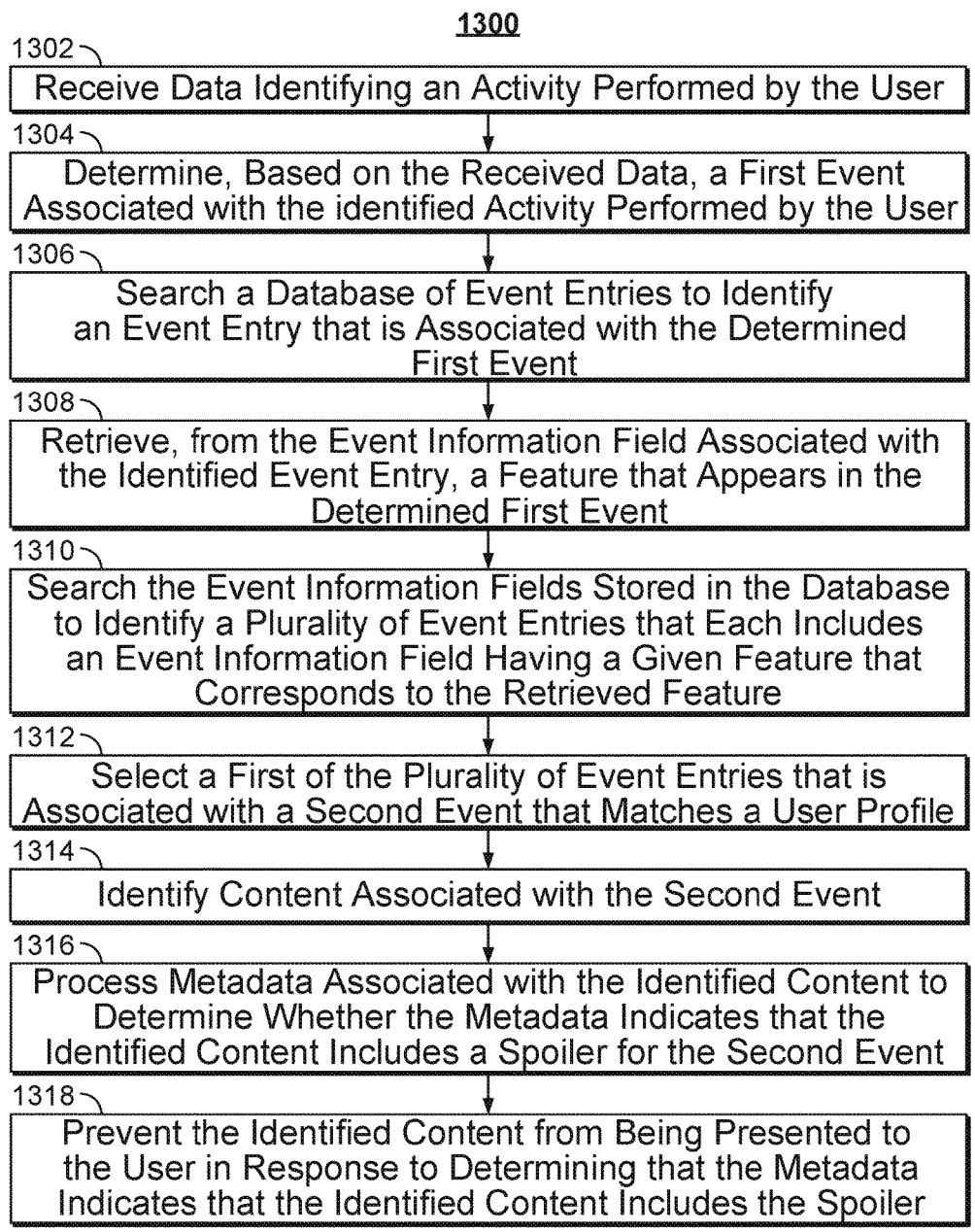
FIG. 13 is a flowchart of another set of illustrative steps for preventing a spoiler from being presented to a user based on an activity, in accordance with some embodiments of the disclosure.

FIG. 13 is a flowchart of another set of illustrative steps for preventing a spoiler from being presented to a user based on an activity, in accordance with some embodiments of the disclosure. For example, a media guidance application implementing process 1300 may be executed by control circuitry 904 (FIG. 9). It should be noted that process 1300 or any portion thereof could be performed on, or be provided by, any of the devices discussed in relation to FIG. 9 or FIG. 10, and utilize any of the databases discussed in relation to FIGS. 4-6. It should also be noted that process 1300 or any of the individual procedures discussed in relation to process 1300 may be combined with any of the other processes in this disclosure, including the processes discussed in relation to FIGS. 11-12 and FIGS. 14-18.

Process 1300 begins at 1302, where the media guidance application receives (e.g., via control circuitry 904 (FIG. 9)) data identifying an activity performed by the user, wherein the activity is associated with a first event. For example, the media guidance application may receive data indicating that the user scheduled a recording for a media asset which is associated with a first event. For instance, the media guidance application may receive data indicating that the user scheduled a recording for the live broadcast of a baseball game between the baseball team "New York Yankees" and another baseball team "Boston Red Sox" to be played the following evening. In general, the received data may take any form, and may correlate to any type of user activity. For example, the media guidance application may receive data identifying a social media communication from the user, user attendance of a live event, user behavior on the Internet, or user interactions with a set-top box. The received data may also indicate that the user accessed a media asset, purchased a media asset, ordered a media asset, purchased a ticket for attending an event, added an appointment to a calendar, or the like.

Process 1300 continues to 1304, where the media guidance application determines (e.g., via control circuitry 904 (FIG. 9)), based on the received data, a first event associated with the identified activity performed by the user. In general, the media guidance application may use the received data to determine a first event associated with the identified activity any number of ways. For example, in some embodiments the received data may include a description of an event associated with the user activity, or an event identifier for an event associated with the user activity. For instance, if the user activity was a request to schedule a recording of an upcoming baseball game, the media guidance application may receive a description of the baseball game itself (e.g., the descriptive text "Yankees vs. Red Sox-Game 1 of Series-7:00 PM EST Thursday, September 15"), or other identifying information which may be used to look up the event in a database (e.g., database 400 (FIG. 4)). Systems and methods for determining events associated with received data identifying user activities are also discussed in relation to FIG. 18, and any of the embodiments discussed in relation to FIG. 18 may be combined, in whole or in part, with Process 1300.

In some embodiments the media guidance application may extract text from the received data, and use the text to search for related events. For example, if the user activity was posting a message to an online forum about an upcoming concert, the media guidance application may extract keywords from the posted message and use those words to search for matching entries in an event or content database (e.g., database 400 (FIG. 4) or database 500 (FIG. 5)) in order to determine events associated with the user activity. In this case, if the media guidance application extracted the keywords "Dolly Parton," "Concert," "Upcoming," and "Jolene," from the message, these keywords could be used to identify the upcoming live concert "Dolly Parton Sings!," where the singer "Dolly Parton" is scheduled to perform her song "Jolene." In some embodiments, this may be done by searching an events database (e.g., database 400 (FIG. 4)) for event entries having fields containing text that matches the identified keywords, or using any other convenient searching algorithm.

Process 1300 continues to 1306, where the media guidance application searches (e.g., via control circuitry 904 (FIG. 9)), a database of event entries to identify an event entry that is associated with the determined first event. For instance, the media guidance application may search an events database (e.g., database 400 (FIG. 4)) and identify event entries (e.g., event entries 412-430 (FIG. 4)) that are associated with the determined first event. The media guidance application may search the database using any convenient technique. For example, if the media guidance application received an event identifier or an event name along with the originally received data, this information may be used to search through the database directly.

In general, the media guidance application may store and maintain a database of event entries (e.g., database 400 (FIG. 4)), or otherwise have access to a database of event entries, wherein each of the event entries includes an event information field that includes a feature that appears in the respective event. This database may be used by the media guidance application to perform one or more steps of process 1300. For example, such a database may contain information for various types of events, such as a movie presented in a movie theater, a concert, a live event, a media asset scheduled for transmission, or a calendar appointment. For each of the events in the database, the media guidance application may store a list of features for the event, such as a person, character, or band associated with the event, a general category or genre for the event, a location and time of the event, or a scene within the event. Other information may be stored as well, and may be used to look up events in the database, such as the start time, end time, duration, and location of the event. Other types of information may include a list of people participating in the event, or a list of people who have expressed an interest in the event (e.g., a list of people who have communicated on social media about the event, or who have scheduled recordings of the event).

Process 1300 continues to 1308, where the media guidance application retrieves (e.g., via control circuitry 904 (FIG. 9)), from the event information field associated with the identified event entry, a feature that appears in the determined first event. For example, if the first event is a rerun of the premiere of the television show "The Walking Dead," represented in database 400 (FIG. 4) by the event entry 426, the media guidance application may retrieve the feature "Zombie Themed" from the event feature information fields 406 associated with the event entry 426.

Process 1300 continues to 1310, where the media guidance application searches (e.g., via control circuitry 904 (FIG. 9)), the event information fields stored in the database to identify a plurality of event entries that each include an event information field having a given feature that corresponds to the retrieved feature. For example, if the media guidance application retrieved the feature "Zombie Themed" from the database 400 (FIG. 4), the media guidance application may search for other event entries 412-430 that include event feature information fields 406 that include the feature "Zombie Themed." In this case, the media guidance application may retrieve the event entries 422, 424, 428, and 430, each of which includes event feature information fields 406 that include the feature "Zombie Themed."

Process 1300 continues to 1312, where the media guidance application selects (e.g., via control circuitry 904 (FIG. 9)), a first of the plurality of event entries that is associated with a second event that matches a user profile. For example, the media guidance application may use the information contained in the user profile to determine which of the events associated with the event entries 422, 424, 428, and 430 is also associated with the user profile, and would be an event that the user is likely to not want to be spoiled. For example, the media guidance application may access a log of content that the user recently accessed from the user profile, or a log of events that the user was recently involved with from the user profile. In this case, the media guidance application may determine if any of the event entries 422, 424, 428, and 430 share similar features to the events or content contained in the logs within the user profile. Systems and methods for selecting events associated with a user profile are also discussed in relation to FIGS. 15-16, and any of the embodiments discussed in relation to FIGS. 15-16 may be combined, in whole or in part, with process 1300.

In some embodiments, selecting one of the plurality of event entries that match a user profile includes the media guidance application determining (e.g., via control circuitry 904 (FIG. 9)) a preferred feature based on the user profile. For example, the media guidance application may access the scheduled recordings of a user from the user profile of the user, and determine that the user tends to record programs that often include a particular preferred feature. For example, if several of the scheduled recordings are for live programming, the media guidance application may determine that the feature "Live Event" is a preferred feature for the user. The media guidance application may then identify, from the plurality of event entries, a subset of event entries including a first event information field having the given feature and a second event information field having the preferred feature. For example, from the list of event entries 422, 424, 428, and 430 (FIG. 4), the event entry 428 is also associated with the preferred feature "Live Event," and may be selected as the event entry that matches the user profile.

In some embodiments, determining a preferred feature based on the user profile includes the media guidance application determining (e.g., via control circuitry 904 (FIG. 9)), from the user profile, a plurality of past activities performed by the user. For example, the media guidance application may access a purchase history from the user profile, and use it to determine the recent purchases made by the user. As an alternate example, the media guidance application may access a list of television programming recently consumed by the user, or a list of social media communications made by the user. The media guidance application may then determine a plurality of previous events associated with the plurality of past activities performed by the user, each of the plurality of previous events being associated with at least one of the plurality of past activities. For example, if the activities are social media communication, the media guidance application may determine each of the events mentioned with the social media communications (e.g., by using natural language processing or keyword extraction to identify terms that can be used to search for related events). The media guidance application may then search the database of event entries to identify a plurality of event entries associated with the determined plurality of previous events, and determine a preferred feature that appears in event entries associated with each of the plurality of previous events. For example, the media guidance application may search for each of the events associated with the social media communications, and determine that the feature "Live Event" occurs frequently within those events. In this case, the media guidance application may determine that the user is likely to enjoy other events associated with the feature "Live Event," and designate the feature "Live Event" as a preferred feature.

In some embodiments, the media guidance application may access the user profiles for other users that are associated with the user, and the selected event entry will match one or more of the user profiles of the other users. For example, if the media guidance application finds that the original user profile contains a list of friends for the user, the media guidance application may retrieve the user profiles for each of those friends. The media guidance application may then determine if any of the event entries 422, 424, 428, and 430 share similar features to the events or content that the friends of the user have recently accessed or expressed interest in. This may be particularly advantageous if the user has similar interests to the friends, since the media guidance application may leverage the content of the friends' user profiles to identify events that the user may not wish to be spoiled. This may also be advantageous if the user frequently engages in events with the friends, since the media guidance application may identify events that the user may not be considering currently, but which the user may nonetheless engage with in the future.

Process 1300 continues to 1314, where the media guidance application identifies (e.g., via control circuitry 904 (FIG. 9)), content associated with the second event. For example, the media guidance application may use the name of the second event or an identifier for the second event to search a content database (e.g., database 500 (FIG. 5)) for content that is associated with the second event. For instance, if the second event has the identifier "RR123" the media guidance application may search database 500 (FIG. 5) and identify the content represented by content entries 514, 518, and 520 (FIG. 5) as being associated with the second event. In some embodiments, the media guidance application may also access an events database (e.g., similar to database 400 (FIG. 4)) that lists both events, and content that is associated with each of the listed events. Then, the media guidance application may identify the associated content by requesting it directly from the events database. It is understood that the content may be a media asset, a social media communication, an advertisement, a text or SMS message, or a commercial. More generally, it is understood that in some embodiments the systems and methods discussed in this disclosure may be adapted to work with any suitable type of content.

In some embodiments, the media guidance application identifies (e.g., via control circuitry 904 (FIG. 9)) the content by monitoring other content being accessed by the user. For example, if the media guidance application determines that the user is scrolling through multiple comments on a particular web page, the media guidance application may search for other comments listed on the web page that are associated with the second event. In some embodiments, the media guidance application may identify content by monitoring content likely to be accessed by the user within a threshold period of time in the future. For example, if the second event is a concert by the artist "Dolly Parton" being performed next week, and the user frequently listens to a particular radio station, the media guidance application may search for programming on that radio station that is scheduled to be presented within the next week, and identify any of the programming that is associated with the upcoming concert by the artist "Dolly Parton."

Process 1300 continues to 1316, where the media guidance application processes (e.g., via control circuitry 904 (FIG. 9)), metadata associated with the identified content to determine whether the metadata indicates that the identified content includes a spoiler for the second event. For example, the media guidance application may access a content database (e.g., database 500 (FIG. 5)) that explicitly lists content items, events associated with each of the content items, and spoiler flags indicating whether or not the content associated with a given entry in the database (e.g., content entries 514-520) contains spoilers for the associated events. In general, these spoiler flags may be generated by any entity that has access to the database, including content providers, and other users. For example, in some embodiments processing the metadata includes the media guidance application determining (e.g., via control circuitry 904 (FIG. 9)), based on the metadata, whether the identified content is associated with a user-generated flag indicating that the identified content contains a spoiler for the second event. For instance, other users may mark certain types of content as containing spoilers for particular events (e.g., through the use of a media guidance application), resulting in a "spoiler warning" flag being stored within the metadata that may be detected by other media guidance applications. Systems and methods for processing metadata associated with content to determine if it includes a spoiler for an event are also discussed in relation to FIG. 17, and any of the embodiments discussed in relation to FIG. 17 may be combined, in whole or in part, with process 1300.

Process 1300 continues to 1318, where the media guidance application prevents (e.g., via control circuitry 904 (FIG. 9)), the identified content from being presented to the user in response to determining that the metadata indicates that the identified content includes the spoiler. The media guidance application may prevent the content from being presented any number of ways. For example, the media guidance application may refuse to display the content, or display alternate content in place of the content. In some embodiments, this alternate content may include alternate video, text, or images that the user profile for the user indicates that the user may enjoy. For example, if the identified content is a television program, the media guidance application may access the user profile of the user and determine a list of television programs that the user has recently watched. The media guidance application may then select a television program similar to the ones contained in the user profile as the alternate content to be presented to the user. As another example, in some embodiments, the media guidance application may use one of the techniques for preventing content from being presented to the user discussed in relation to FIGS. 1-3 as part of process 1300.

In some embodiments, the media guidance application may determine (e.g., via control circuitry 904 (FIG. 9)) whether the user has previously accessed the identified content, and allow the identified content to be presented to the user in response to determining that the metadata indicates that the identified content includes a spoiler instead of preventing it from being presented. For example, the media guidance application may access a user profile for the user, and access the user's history to determine if the content has been presented to the user in the past. If the media guidance application determines that identified content has already been presented to the user in the past, the media guidance application executing process 1300 may simply present the episode to the user rather than preventing it from being presented at 1318.

In some embodiments, preventing the identified content from being presented includes the media guidance application receiving (e.g., via control circuitry 904 (FIG. 9)), from the user, a request to access the identified content. For example, if the identified content is an episode of the zombie-themed television show "The Walking Dead," the media guidance application may receive a request to tune to that episode of the television show "The Walking Dead." The media guidance application may then present to the user, in response to receiving the request, alternate content different from the identified content. In some embodiments, the alternate content may be generated by the media guidance application. For example, the media guidance application may generate a prompt similar to one of the prompts discussed in relation to FIGS. 1-3. In some embodiments, the alternate content may include a selectable option, the selectable option comprising at least one of an option to have the identified content presented (e.g., similar to selectable option 204 of display 200 (FIG. 2)), an option to delay presentation of the identified content to a later time (e.g., similar to selectable option 206 of display 200 (FIG. 2)), and an option to not view the identified content (e.g., similar to options 303-310 of display 300 (FIG. 3)). For example, instead of simply presenting the requested episode of the television show "The Walking Dead," the media guidance application may display a prompt warning the user that the content that he or she requested may contain spoilers, and asking the user he or she wishes to proceed.

In some embodiments, presenting the alternate content may include the media guidance application identifying (e.g., via control circuitry 904 (FIG. 9)) a possible content alternative, the possible content alternative being a type of content that is the same as the identified content. For example, if the identified content was an episode of the zombie-themed television show "The Walking Dead," the media guidance application may identify other zombie-themed programming that is currently available as potential content alternatives. The media guidance application may then process metadata associated with the possible content alternative to determine whether metadata associated with the possible content alternative indicates that the possible content alternative includes the spoiler for the second event. For example, if the originally requested episode of the television show "The Walking Dead" isn't being presented because it contains spoilers for a newly released movie, the media guidance application may verify that the alternate content does not contain spoilers for the newly released movie. The media guidance application then presents the possible content alternative to the user as the alternate content in response to determining that the metadata associated with the possible content alternative indicates that the identified content does not include a spoiler.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. For example, a media guidance application may determine events associated with a identified activity at 1304 by making use of an events database (e.g., database 400 (FIG. 4)), while simultaneously searching the database for event entries associated with those events at 1306. This may reduce the total amount of time needed to perform process 1300. Furthermore, it should be noted that any of the devices or equipment discussed in relation to FIG. 9 or FIG. 10 or the databases discussed in relation to FIGS. 4-6 could be used to perform one or more of the steps in FIG. 13.

Figure 14:
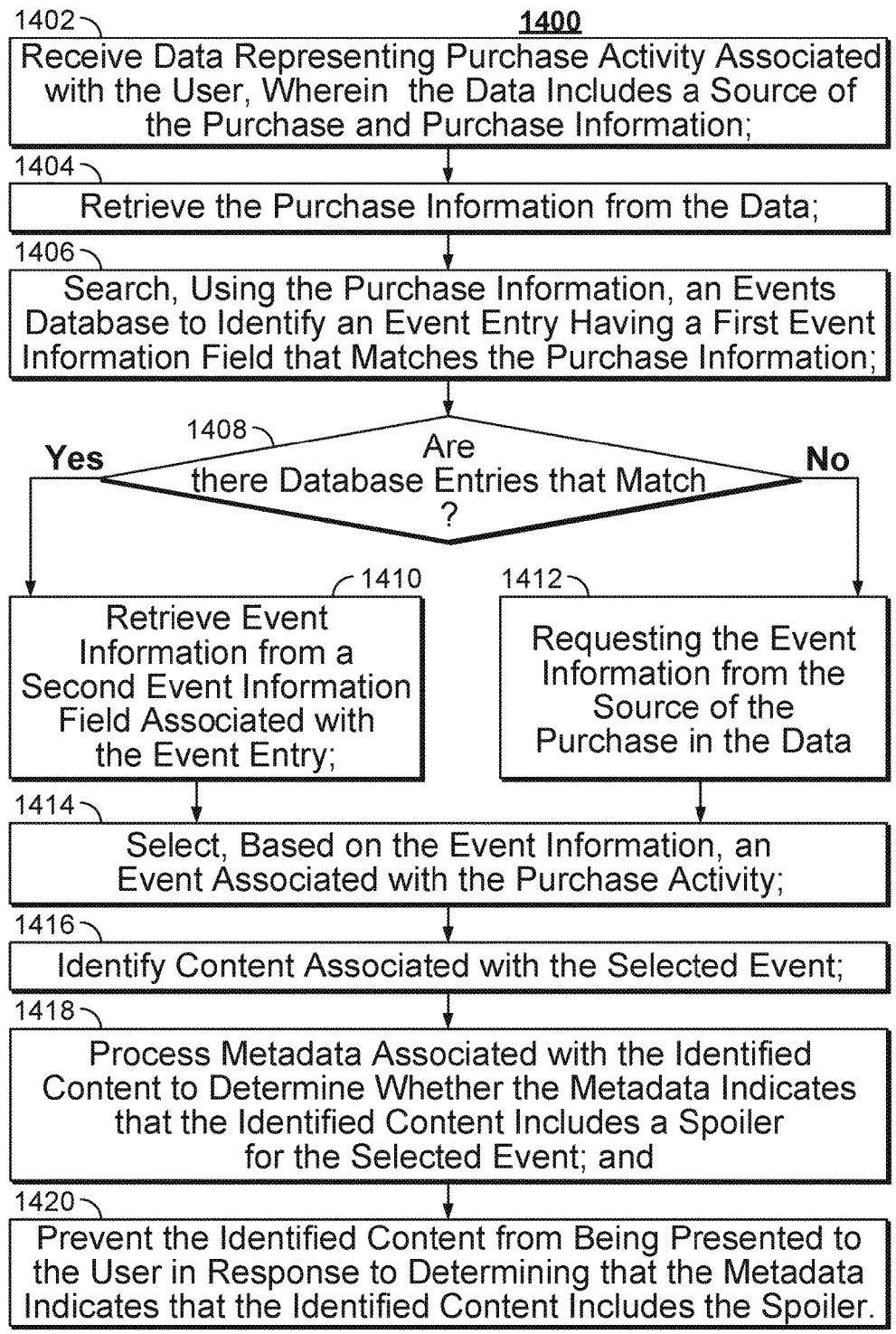
FIG. 14 is a flowchart of illustrative steps for preventing a spoiler from being presented to a user based on a purchase activity, in accordance with some embodiments of the disclosure.

FIG. 14 is a flowchart of illustrative steps for preventing a spoiler from being presented to a user based on a purchase activity, in accordance with some embodiments of the disclosure. For example, a media guidance application implementing process 1400 may be executed by control circuitry 904 (FIG. 9). It should be noted that process 1400 or any portion thereof could be performed on, or be provided by, any of the devices discussed in relation to FIG. 9 or FIG. 10, and utilize any of the databases discussed in relation to FIGS. 4-6. It should also be noted that process 1400 or any of the individual procedures discussed in relation to process 1400 may be combined with any of the other processes in this disclosure, including the processes discussed in relation to FIG. 11-13 or FIGS. 15-18.

Process 1400 begins at 1402, where the media guidance application receives (e.g., via control circuitry 904 (FIG. 9)) data representing purchase activity associated with the user, wherein the data includes a source of the purchase and purchase information. For example, the media guidance application may receive data packets (e.g., transmitted via communications network 1014) indicating that a particular item was purchased from the online retailer "TicketMaster.com"™, and purchase information such as the date and time of the purchase, a description of the purchase, an identifying code for the purchase (e.g., an ISBN, barcode, serial code, purchase code, or the like), or other suitable information about the purchase.

Process 1400 continues to 1404, where the media guidance application receives (e.g., via control circuitry 904 (FIG. 9)) the purchase information from the data. For example, the media guidance application may take the received data, and extract the purchase information from the data. This may include the media guidance application re-formatting the purchase information into a standardized format (e.g., the format used by a purchases database such as database 600 (FIG. 6) or an events database such as database 400 (FIG. 4)).

Process 1400 continues to 1406, where the media guidance application searches (e.g., via control circuitry 904 (FIG. 9)), using the purchase information, an events database (e.g., database 400 (FIG. 4) to identify an event entry (e.g., one of event entries 412-430 (FIG. 4)) having a first event information field (e.g., one of the associated purchase code information fields 410 (FIG. 4)) that matches the purchase information. For example, the media guidance application may search database 400 (FIG. 4) for event entries 412-430 (FIG. 4) that have an associated purchase code information field 410 (FIG. 4) that matches the purchase code contained in the purchase information.

Process 1400 continues to 1408, where the media guidance application determines (e.g., via control circuitry 904 (FIG. 9)) whether the events database includes an event entry having a first event information field that matches the purchase information. For example, if the purchase information included the purchase code "X012Y," the media guidance application may search database 400 (FIG. 4) for event entries 412-430 (FIG. 4) that have an associated purchase code information field 410 (FIG. 4) that matches the purchase code "X012Y." In response to determining that the events database includes an event entry having a first event information field that matches the purchase information, process 1400 continues to 1410. For example, because event entry 412 (FIG. 4) includes an information field that matches the purchase code "X012Y," process 1400 would continue to 1410. Alternately, in response to determining that the events database does not include an event entry having a first event information field that matches the purchase information, process 1400 continues to 1412.

At 1410 the media guidance application retrieves (e.g., via control circuitry 904 (FIG. 9)), event information from a second event information field associated with the event entry. For example, if the media guidance application previously determined that the event entry 412 (FIG. 4) includes an information field that matches the purchase code "X012Y," the media guidance application may retrieve information from a different information field 402-408 (FIG. 4) of event entry 412 (FIG. 4). For instance, the media guidance application may retrieve the name of the event associated with event entry 412 (FIG. 4) from event name information field 402 (FIG. 4), "Dolly Parton Sings!" Afterwards, process 1400 continues to 1414.

At 1412 the media guidance application requests (e.g., via control circuitry 904 (FIG. 9)), the event information from the source of the purchase in the received data. For example, if the purchase source indicated in the originally received information was the online retailer "TicketMaster.com,"™ the media guidance application may submit a request to the online retailer "TicketMaster.com"™ (e.g., via communications network 1014) to provide event information for an event associated with the user's purchase activity. Afterwards, process 1400 continues to 1414.

In some embodiments, requesting (e.g., via communications network 1014), from the source of the purchase, event information associated with the purchase information includes the media guidance application identifying (e.g., via control circuitry 904 (FIG. 9)) the source that received the purchase from the user based on the received data. For example, if the received data includes an image of a purchase receipt, the media guidance application may analyze the image (e.g., via control circuitry 904 (FIG. 9)) using optical character recognition (OCR) or text extraction techniques, and identify the source of the purchase based on the extracted text. For example, if the image of the receipt includes the text "AMC Theatres," the media guidance application may determine that the source of the purchase was the movie theater chain "AMC Theaters." In general, the media guidance application may make this determination by checking the extracted text against a database of known retailers (e.g., accessible via communications network 1014). In some embodiments, the media guidance application may extract similar information from barcodes or QR codes contained on images received as part of the received data.

In some embodiments, after identifying the source that received the purchase from the user, the media guidance application then searches (e.g., via control circuitry 904 (FIG. 9)) for an account associated with the user for accessing the identified source. For example, if the identified source is the online retailer "Amazon.com"™, the media guidance application may search for the user's account with the online retailer "Amazon.com"™. In this situation, the media guidance application may, for example, access previously stored user credentials for the account, or prompt the user to provide information about his or her account, such as his or her username. The media guidance application then transmits a request to the source, based on the determined account, for the event information associated with the purchase. For example, the media guidance application may submit a request to the online retailer "Amazon.com"™ (e.g., by using an API to submit a request over communications network 1014) for additional information regarding the user's purchase, and include the user's identifying information (e.g., a username) in the request.

In some embodiments, the transmitted request may include user credentials, the user credentials being usable by the source to verify that the request was approved by the user. For example, the user credentials may include a user password, a pin code, an audio recording of a passphrase spoken by the user, and image of the user to be used as part of a facial recognition algorithm, biometric data such as a thumbprint, or any other type of convenient authentication. The user may either obtain these credentials automatically, (e.g. by using a microphone or camera attached to the user device running the media guidance application), or the media guidance application may prompt the user to provide the credentials. As another example, the online retailer may require that the request be made from an authenticated user device. In this case, the media guidance application may access (e.g., via control circuitry 904 (FIG. 9)) the appropriate authentication key stored within the user device and provide it along with the request, or the purchase source may recognize the device based on a device identifier, such as a media access control (MAC) address.

In some embodiments, the media guidance application receives (e.g., via control circuitry 904 (FIG. 9)) the event information requested from the source of the purchase in the data. For example, if the media guidance application requested event information for events associated with the user's recent purchase from the online retailer "TicketMaster.com,"™ the media guidance application may receive event information for an event associated with the user's purchase activity back from the online retailer "TicketMaster.com"™ (e.g., via communications network 1014). In general, this event information may be of any type, and include an event identifier, the time and title of the event, or any other type of suitable information about the event. The media guidance application then submits (e.g., via control circuitry 904 (FIG. 9)), to the events database, a request to create a new event entry having a third event information field that matches the purchase information included in the received data, and a fourth event information field that matches the event information received. For example, if the media guidance application receives information from the purchase source indicating that the event entitled "Dolly Parton Sings!" is associated with the original purchase information, the media guidance application may cause a new event entry to be created in an events database (e.g., database 400 (FIG. 4)) containing information fields for the name of the event "Dolly Parton Sings!" and the purchase information originally received by the media guidance application.

In some embodiments, the media guidance application stores (e.g., via control circuitry 904 (FIG. 9)), in a purchase activities database, purchase activities associated with the user, wherein the purchase activities database includes a plurality of purchase activity entries, and each purchase activity entry includes a purchase source field and an event information field. For example, the media guidance application may maintain a purchase activities database similar to database 600 (FIG. 6). In this case, the database 600 may include several purchase entries 612-616 associated with the user, and each of the purchase entries 612-616 may include an information field for the purchase source 604, an event information field (e.g., event ID field 608), and other information fields for storing various types of other purchase information. The media guidance application then adds (e.g., via control circuitry 904 (FIG. 9)) to the purchase activities database a new purchase activity entry for the received purchase activity associated with the user based on the event information associated with the purchase information.

Process 1400 continues to 1414, where the media guidance application selects (e.g., via control circuitry 904 (FIG. 9)), based on the event information, an event associated with the purchase activity. In general, the selected event may be a movie presented in a movie theater, a concert, a live event, a media asset scheduled for transmission, a calendar appointment, or any other suitable type of event. Depending on the type of the event, the media guidance application may query any type of appropriate database with the event information. For example, in some embodiments, selecting an event associated with the purchase activity includes the media guidance application identifying (e.g., via control circuitry 904 (FIG. 9)), using the events database (e.g., database 400 (FIG. 4), an event associated with the event information. For instance, if the event information is the event ID "AA123," the media guidance application may use the event information to search for entries in an events database (e.g., database 400 (FIG. 4), for events with corresponding event entries 412-430 (FIG. 4) that include information fields 402-410 (FIG. 4) that match the event ID "AA123." In this case, the media guidance application would select the event entitled "Dolly Parton Sings!" represented by event entry 412 as the event associated with the purchase activity. The media guidance application then determines, using the events database, a plurality of related events associated with the identified event. For example, the media guidance application may look up related events (e.g., via control circuitry 904 (FIG. 9)) in database 400 by requesting information from the associated event information fields 408 for event entry 412. In this case, the media guidance application may obtain the event ID "BB234" corresponding to the concert event entitled "Jack White Croons!" represented by event entry 414, and the scheduled broadcast event of the film "9 to 5" represented by event entry 416. The media guidance application then selects (e.g., via control circuitry 904 (FIG. 9)), as the event associated with the purchase activity, one of the plurality of related events. For example, the media guidance application may select the scheduled broadcast of the film "9 to 5" as the event associated with the user's purchase activity.

Process 1400 continues to 1416, where the media guidance application identifies (e.g., via control circuitry 904 (FIG. 9)) content associated with the selected event. For example, the media guidance application may accomplish this by searching a version of database 400 (FIG. 4) that includes information fields in each of the event entries 412-430 listing content associated with the selected event. As another example, the media guidance application may search a content database (e.g., similar to database 500), where each of the entries lists the events associated with each content item.

In some embodiments, identifying the content includes the media guidance application monitoring (e.g., via control circuitry 904 (FIG. 9)) other content being accessed by the user, and searching for a plurality of content likely to be accessed by the user within a threshold period of time in the future. For example, if the media guidance application determines that the user is currently watching a movie stored on his or her DVR that will end in the next 20 minutes, the media guidance application may anticipate that at the end of the movie the user will be brought back to whatever live programming he or she was previously watching on their television. In this case, the media guidance application may search for content being broadcast in the next 20 minutes that is associated with the previously selected event. This may allow the media guidance application to prioritize checking for content that the user is likely to access in the near future. In some embodiments, the media guidance application may always check whatever content the user is about to access (e.g., whatever is being broadcast on the channel that the user will be brought to when he or she stops watching a movie from the DVR, or VOD programming) in order to determine if it is related to the selected event prior to presenting the content.

Process 1400 continues to 1418, where the media guidance application processes (e.g., via control circuitry 904 (FIG. 9)) metadata associated with the identified content to determine whether the metadata indicates that the identified content includes a spoiler for the selected event. For example, if the media guidance application determines that certain content is associated with a selected event, the media guidance application may search a content database (e.g., database 500) and search for content metadata. The media guidance application may then use the content metadata to determine if the content contains a spoiler for the selected event. For example, the media guidance application may search a content database (e.g., database 500 (FIG. 5)) for metadata indicating whether or not the content contains spoilers for the selected event. For instance, this may be done by accessing the spoiler flag fields 512 for the content entry 514-520 representing the content, and determine whether or not the spoiler flag information fields indicate that the content contains a spoiler for the selected event. Other techniques for processing metadata and determining whether metadata indicates that identified content contains spoilers, which may be used in conjunction with some embodiments of process 1100, are discussed in relation to FIG. 17.

Process 1400 continues to 1420, where the media guidance application prevents (e.g., via control circuitry 904 (FIG. 9)) the identified content from being presented to the user in response to determining that the metadata indicates that the identified content includes the spoiler. For example, if the media guidance application determines that a particular website contains a spoiler that should not be presented to the user, the media guidance application may prevent the user from accessing the website.

In some embodiments, preventing the identified content from being presented includes the media guidance application receiving (e.g., via control circuitry 904 (FIG. 9)), from the user, a request to access the identified content. For example, if the identified content is a talk show currently airing on a particular channel, the media guidance application may have received (e.g., via user input interface 910 (FIG. 9)) a request to tune to the channel airing the talk show. The media guidance application then presents, to the user, in response to receiving the request, alternate content different from the identified content. For example, the media guidance application may tune to a different channel where a different talk show is being broadcast. In this case, the media guidance application may cause a prompt to be displayed to the user (e.g., prompt 104, display 200, or display 300) informing the user that the media guidance application determined that the originally requested show contains spoilers for an event that the media guidance application believes the user may not wish to be spoiled. In some embodiments, the media guidance application may also use one of the techniques for preventing content from being presented to the user discussed in relation to FIGS. 1-3 as part of process 1400.

In some embodiments, preventing the identified content from being presented includes the media guidance application (e.g., via control circuitry 904 (FIG. 9)) determining an end time for the event associated with the purchase activity. For example, if the premiere of the movie "Evil Dead!" is the event that the media guidance application determined to be associated with the user's purchase activity, the media guidance application may use an events database (e.g., database 400) to look up an end time for the premiere of the movie "Evil Dead!". The media guidance application then prevents the identified content from being presented in response to determining that the current time is earlier than the end time. For example, if the identified content is a DVR recording of a talk show where the lead actor from the movie "Evil Dead!" is an invited guest, the media guidance application may prevent the user from accessing that DVR recording until after the premiere of the movie "Evil Dead!" has ended.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, the media guidance application may request event information from the source of the purchase at 1412 while simultaneously searching an events database to identify event entries having a first event information field that matches the purchase information at 1406. This may allow process 1400 to make a more comprehensive search for all of the events potentially associated with the purchase activity, making use of multiple sources (e.g., both the events database, and the source of the purchase). Furthermore, it should be noted that any of the devices or equipment discussed in relation to FIG. 9 or FIG. 10 or the databases discussed in relation to FIGS. 4-6 could be used to perform one or more of the steps in FIG. 14.

Figure 15:
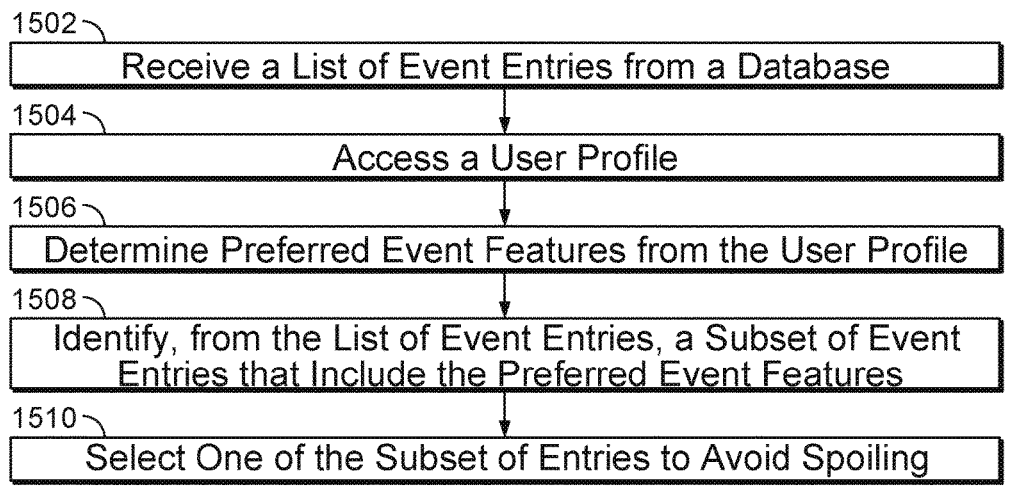
FIG. 15 is a flowchart of illustrative steps for selecting events associated with a user profile, in accordance with some embodiments of the disclosure.

FIG. 15 is a flowchart of illustrative steps for selecting events associated with a user profile, in accordance with some embodiments of the disclosure. For example, a media guidance application implementing process 1500 may be executed by control circuitry 904 (FIG. 9). It should be noted that process 1500 or any portion thereof could be performed on, or be provided by, any of the devices discussed in relation to FIG. 9 or FIG. 10, and utilize any of the databases discussed in relation to FIGS. 4-6. It should also be noted that process 1500 or any of the individual procedures discussed in relation to process 1500 may be combined with any of the other processes in this disclosure, including the processes discussed in relation to FIG. 11-14 or FIGS. 16-18.

Process 1500 begins at 1502, where the media guidance application receives (e.g., via control circuitry 904 (FIG. 9)) a list of event entries from a database (e.g., database 400 (FIG. 4) or database 500 (FIG. 5)). For example, the media guidance application may receive a list of event entries 412-430 from database 400 representing events that include a particular feature. In general, the list of event entries may be retrieved from the database by the media guidance application as part of another process or procedure (e.g., as part of process 1300 at 1308 (FIG. 13), or process 1200 at 1206 (FIG. 12)).

Process 1500 continues to 1504, where the media guidance application accesses (e.g., via control circuitry 904 (FIG. 9)) a user profile. For example, the media guidance application may access a user profile stored locally (e.g., as part of storage 908 (FIG. 9)), or stored remotely (e.g., on media guidance data source 1018 accessible through communications network 1014 (FIG. 10)). In general, the user profile may contain a user activity log, a user purchase history, a log of recently accessed content, demographic information about the user, or the like. Furthermore, the media guidance application may use any of the information contained in the user profile in order to identify events that are associated with the user profile.

Process 1500 continues to 1506, where the media guidance application determines (e.g., via control circuitry 904 (FIG. 9)) preferred event features from the user profile. For example, the media guidance application may use the information contained in the user profile, such as a log of recently accessed content by the user, and determine preferred features that are included in events that the user is likely to engage with. For example, if the media guidance application determines (e.g., via control circuitry 904 (FIG. 9)) that the user has recently accessed a number of horror movies from an OTT content provider, the media guidance application may determine that the feature "Genre: Honor" is a preferred feature for the user, and that the user is likely to engage with events that include the feature "Genre: Honor." Methods for determining preferred event features are also discussed in relation to FIG. 16.

Process 1500 continues to 1508, where the media guidance application identifies (e.g., via control circuitry 904 (FIG. 9)), from the list of event entries, a subset of event entries that includes the preferred event features. For example, if the media guidance application determined, based on the user profile, that the feature "Genre: Honor" is a preferred feature, the media guidance application may search for a subset of event entries that includes the feature "Genre: Horror" as one of the information fields within the entry. For instance, if the original list of event entries received by the media guidance application was event entries 412-430 from database 400 (FIG. 4), the media guidance application may search for which of the event entries 412-430 includes an event feature information field 406 that includes the feature "Genre: Honor." In this case, the media guidance application may select event entries 422, 426, 428, and 430 as the subset of event entries.

Process 1500 continues to 1510, where the media guidance application selects (e.g., via control circuitry 904 (FIG.

9)) one of the subset of event entries to avoid spoiling. For example, from the subset of event entries 422, 426, 428, and 430, the media guidance application may select event entry 422, representing the scheduled broadcast of a television show entitled "The Walking Dead Season Premiere," as the event to avoid spoiling. In general, the media guidance application may select one of the subset of event entries at random, or according to one or more algorithms. For example, in some embodiments, the media guidance application may find additional preferred features based on the user profile, and select the event entry that matches the largest number of preferred features.

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, the media guidance application may access a user profile at 1504 and begin determining preferred event features from the user profile at 1506 prior to receiving the list of event entries from a database at 1502. This may allow process 1500 to operate more efficiently, and may increase the overall speed of process 1500. Furthermore, it should be noted that any of the devices or equipment discussed in relation to FIG. 9 or FIG. 10 or the databases discussed in relation to FIGS. 4-6 could be used to perform one or more of the steps in FIG. 15.

Figure 16:
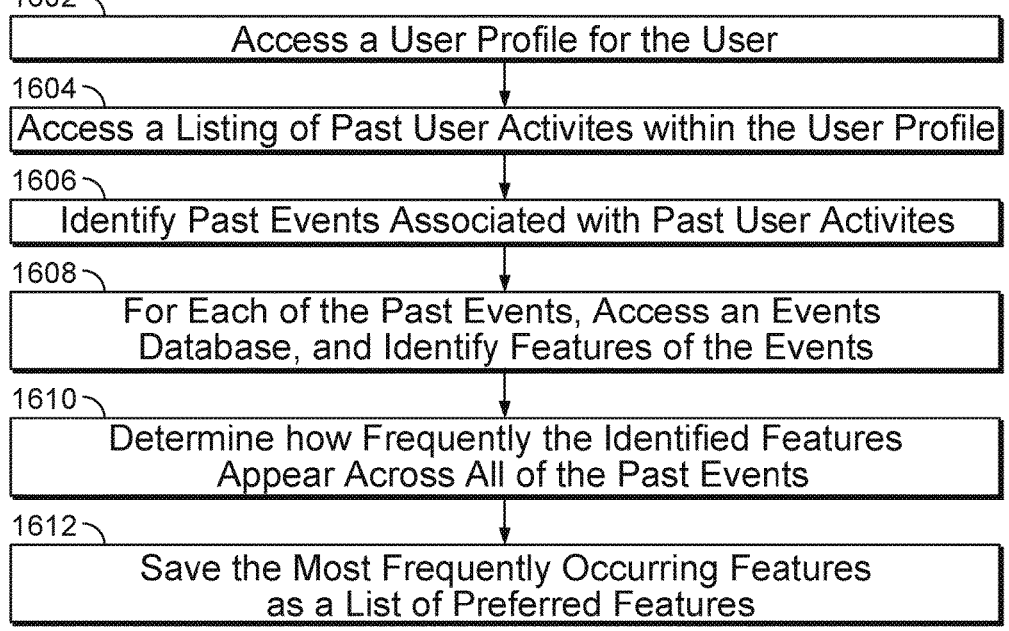
FIG. 16 is a flowchart of illustrative steps for identifying preferred event features using a user profile, in accordance with some embodiments of the disclosure.

FIG. 16 is a flowchart of illustrative steps for identifying preferred event features using a user profile, in accordance with some embodiments of the disclosure. For example, a media guidance application implementing process 1600 may be executed by control circuitry 904 (FIG. 9). It should be noted that process 1600 or any portion thereof could be performed on, or be provided by, any of the devices discussed in relation to FIG. 9 or FIG. 10, and utilize any of the databases discussed in relation to FIGS. 4-6. It should also be noted that process 1400 or any of the individual procedures discussed in relation to process 1400 may be combined with any of the other processes in this disclosure, including the processes discussed in relation to FIGS. 11-15 or FIGS. 17-18.

Process 1600 begins at 1602, where the media guidance application accesses (e.g., via control circuitry 904 (FIG. 9)) a user profile for the user. For example, similar to process 1500 at 1502, the media guidance application may access a user profile stored locally (e.g., as part of storage 908 (FIG. 9)), or stored remotely (e.g., on media guidance data source 1018 accessible through communications network 1014 (FIG. 10)). In some embodiments, the media guidance application may also request the user profile from an external source (e.g., via communications network 1014 from media guidance data source 1018 (FIG. 10)).

Process 1600 continues to 1604, where the media guidance application accesses (e.g., via control circuitry 904 (FIG. 9)) a listing of past user activities within the user profile. In general, the user profile may contain a user activity log, a user purchase history, a log of recently accessed content, demographic information about the user, or the like. The media guidance application may access any portion of the user profile in order to obtain a listing of past user activities. For example, the media guidance application may access a user purchase history from the user profile, which lists information about various purchases made by the user in the past (e.g., similar to the purchase entries 612-616 contained in database 600 (FIG. 6)).

Process 1600 continues to 1606, where the media guidance application identifies (e.g., via control circuitry 904 (FIG. 9)) past events associated with past user activities. For example, if the media guidance application retrieved a list of past purchases made by the user, the media guidance application may look up events associated with each of those past purchases in a purchases database (e.g., database 600). For instance, if the user profile indicated that the user previously made a purchase associated with purchase code "SCI76," the media guidance application may search database 600 for purchase entries 612-616 with a purchase code field 602 that matches the purchase code "SCI76." In this case, the media guidance application might identify purchase entry 614, representing a purchase of the live event ticket "General Admission for Evil Dead with Walking Dead Sneak Peek" from the online ticket retailer "Fandango.com."™ The media guidance application may then access the associated event fields 606 for purchase entry 614 in order to identify the past events associated with the user activity. In this case, the media guidance application may identify the event entitled "Evil Dead!" associated with event identifier JJ234, the event entitled "See Evil Dead with Tom" associated with event identifier KK456, and the event entitled "The Walking Dead Season Premiere" associated with event identifier FF789.

Process 1600 continues to 1608, where, for each of the past events, the media guidance application accesses (e.g., via control circuitry 904 (FIG. 9)) an events database (e.g., database 400 (FIG. 4), and identifies features of the events. For example, given the list of past events that includes the event entitled "Evil Dead!" associated with event identifier JJ234, the event entitled "See Evil Dead with Tom" associated with event identifier KK456, and the event entitled "The Walking Dead Season Premiere" associated with event identifier FF789, the media guidance application may search the database 400 and determine that these events are associated with event entries 428, 430, and 422, respectively. In this case, the media guidance application may identify the features of these events by requesting, from database 400, the features listed in the event feature information fields 406 associated with each of the respective event entries. For example, the media guidance application may request the event feature information fields associated with event entry 422, and receive a list of event features including the features "Scheduled Broadcast," "Genre: Horror," and "Zombie Themed."

Process 1600 continues to 1610, where the media guidance application determines (e.g., via control circuitry 904 (FIG. 9)) how frequently the identified features appear across all of the past events. For example, given the past events represented by event entries 428, 430, and 422, the media guidance application may determine that the feature "Scheduled Broadcast" appears in one event, the feature "Live Event" appears in one event, the feature "Calendar Appointment for Live Event" appears in one event, the feature "Midnight Movie" appears in two events, the feature "Genre: Horror" appears in all three events, and the feature "Zombie Themed" appears in all three events. It is understood that the media guidance application may determine this information any number of ways. For example, the media guidance application may check each of the event entries 428, 430, and 422 in series, and keep a running tally of the number of times each feature appears inside of a table within local memory (e.g., storage 908).

Process 1600 continues to 1612, where the media guidance application saves (e.g., via control circuitry 904 (FIG. 9)) the most frequently occurring features as a list of preferred features. For example, in the example above, the media guidance application may save the features "Genre:

Horror" and "Zombie Themed" as the list of preferred features, because they were the most frequently occurring features that appeared across all of the past events. The list of preferred features, or any of the features on the list of preferred features, may then be used by the media guidance application in order to identify content or events associated with the user profile (e.g., as part of process 1500 (FIG. 15), process 1300 (FIG. 13), or process 1200 (FIG. 12)).

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, if the listing of past user activities includes a list of events as well as features of the events, there may be no need to access an events database in order to identify the features of the events at 1608. Alternately, it may be possible to perform the subroutines at 1606 and 1608 in parallel, by looking up each of the past events in the events database while simultaneously searching for additional past events associated with the past user activities. This may allow process 1600 to operate more efficiently, and may increase the overall speed of process 1600. Furthermore, it should be noted that any of the devices or equipment discussed in relation to FIG. 9 or FIG. 10 or the databases discussed in relation to FIGS. 4-6 could be used to perform one or more of the steps in FIG. 16.

Figure 17:
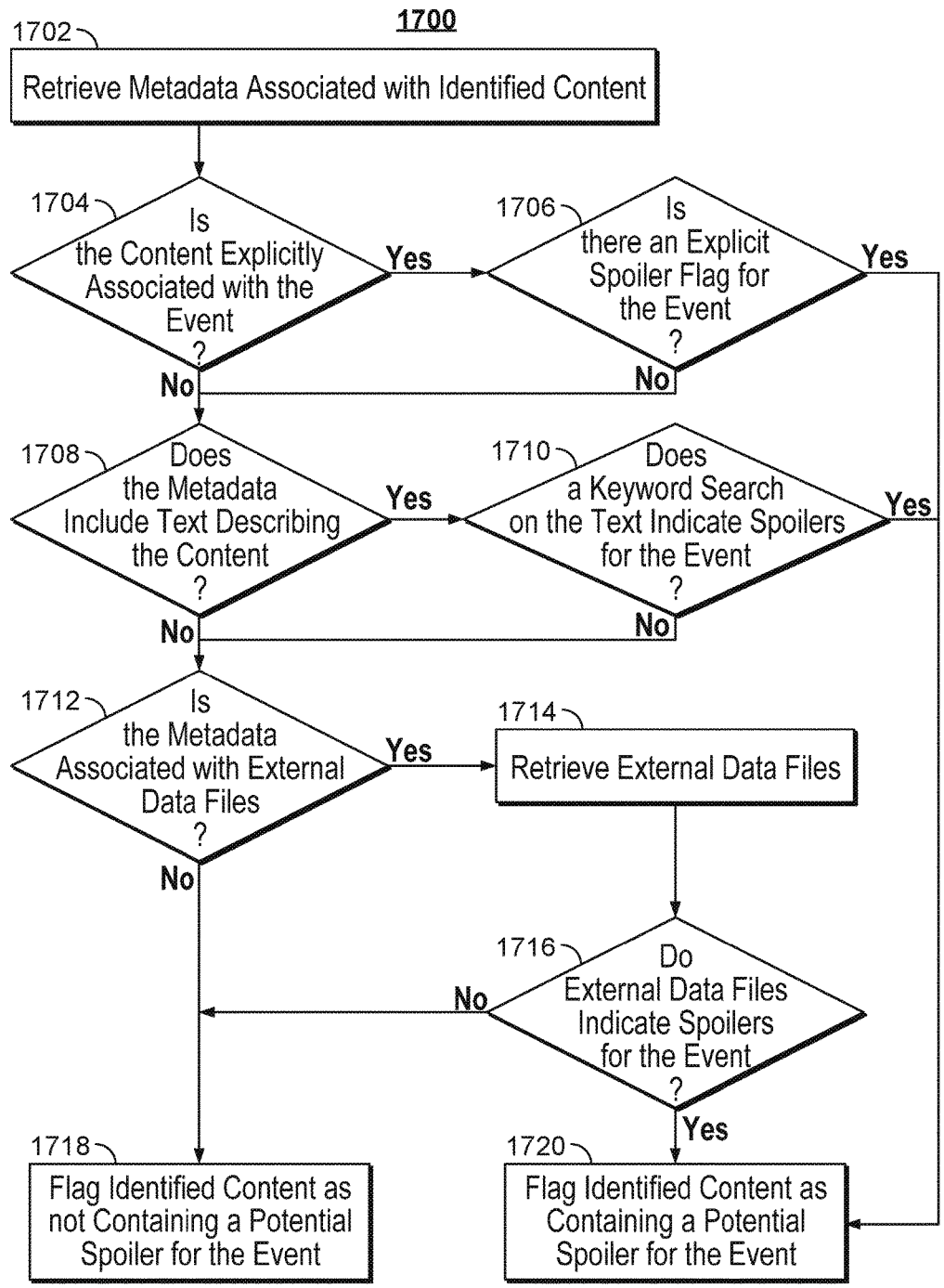
FIG. 17 is a flowchart of illustrative steps for processing metadata associated with content to determine if it includes a spoiler for an event, in accordance with some embodiments of the disclosure.

FIG. 17 is a flowchart of illustrative steps for processing metadata associated with content to determine if it includes a spoiler for an event, in accordance with some embodiments of the disclosure. For example, a media guidance application implementing process 1700 may be executed by control circuitry 904 (FIG. 9). It should be noted that process 1700 or any portion thereof could be performed on, or be provided by, any of the devices discussed in relation to FIG. 9 or FIG. 10, and utilize any of the databases discussed in relation to FIGS. 4-6. It should also be noted that process 1700 or any of the individual procedures discussed in relation to process 1700 may be combined with any of the other processes in this disclosure, including the processes discussed in relation to FIGS. 11-16 or FIG. 18.

Process 1700 begins at 1702, where the media guidance application retrieves (e.g., via control circuitry 904 (FIG. 9)) metadata associated with identified content. The media guidance application may retrieve metadata from a local storage device (e.g., storage 908 (FIG. 9)), from a remote location (e.g., from media guidance data source 1018 via communications network 1014 (FIG. 10)), or from any other convenient location. In some embodiments, the media guidance application may retrieve the metadata associated with the identified content from a content database (e.g., database 500 (FIG. 5)). For example, the media guidance application may request (e.g., via control circuitry 904 (FIG. 9)) metadata associated with the television program entitled "The Walking Dead Recap Show" from database 500, and receive the information contained in content entry 516 in response. In general, the media guidance application may identify the content to database 500 by transmitting identifying information for the content, such as a content identifier, content keywords, or the content name. For illustrative purposes, the retrieved metadata may be described in a manner similar to the content entries 514-520 in database 500 (FIG. 5), but it is understood that the metadata may be retrieved in any format, and that the media guidance application may be easily adapted to make similar determinations to the ones discussed in relation to FIG. 17 regardless of the format of the metadata.

Process 1700 continues to 1704, where the media guidance application determines (e.g., via control circuitry 904 (FIG. 9)) whether the content is explicitly associated with the event. For example, if the event was a scheduled broadcast of the television show entitled "The Walking Dead Season Premiere" represented by event ID "FF789," the media guidance application may check the associated content fields 510 of the content entry 516 to see if they contained the event ID "FF789." In response to determining that the content is explicitly associated with the event, process 1700 continues to 1706. For example, if the media guidance application determines that content entry 516 does include an associated content information field that matches the event ID "FF789," and that the content represented by content entry 516 is therefore associated with the event, process 1700 will continue to 1706. In response to determining that the content is not explicitly associated with the event, process 1700 continues to 1708. For example, if there were no associated content information fields in content entry 516, or if the metadata otherwise provides no indication to the media guidance application that the content and the event are associated together, then process 1700 continues directly to 1704.

At 1706 the media guidance application determines (e.g., via control circuitry 904 (FIG. 9)) whether there is an explicit spoiler flag for the event. For example, if the metadata is formatted similar to the information contained in content entry 516 of database 500 (FIG. 5), the media guidance application may make the determination by checking the value of the spoiler flag information field 512 associated with the event within content entry 516. In this case, if the media guidance application previously determined that the event was a scheduled broadcast of the television show entitled "The Walking Dead Season Premiere" represented by event identifier "FF789," the media guidance application may determine that the information contained in the spoiler flag information field 512 of content entry 516 indicates that, "Yes," the identified content does contain a spoiler for the event. In response to determining that there is an explicit spoiler flag for the event, process 1700 proceeds to 1720. For example, if the media guidance application determined that, "Yes," the identified content does contain a spoiler for the event, process 1700 proceeds to 1720, where the media guidance application flags the identified content as containing a potential spoiler for the event. In response to determining that there is not an explicit spoiler flag for the event, process 1700 proceeds to 1708. For example, if there was no spoiler flag for the event in content entry 516, or if the metadata otherwise provides no indication to the media guidance application that there is a spoiler flag for the event, then process 1700 continues to 1708.

At 1708 the media guidance application determines (e.g., via control circuitry 904 (FIG. 9)) whether the metadata includes text describing the content. For example, if the metadata is stored in a format similar to the content entries 514-520 of database 500 (FIG. 5), the media guidance application may determine whether or not there are keyword fields 506 or description fields 508 for the content entry 514-520 associated with the content. In general, the media guidance application may search for any suitable form of text in the metadata describing with the content. For example, if the content includes audio or video, the media guidance application may determine whether there is a set of subtitles included in the metadata, or a transcript of the audio content included in the metadata. In response to determining that the metadata includes text describing the content, process 1700 proceeds to 1710. Alternately, in response to determining that the metadata does not include text describing the content, process 1700 proceeds to 1712. For example, if there were no keyword fields 506 or description fields 508 for the content entry 514-520 associated with the content, or if the metadata otherwise provides no indication to the media guidance application that there is text describing the content, process 1700 continues to 1708.

At 1710 the media guidance application determines (e.g., via control circuitry 904 (FIG. 9)) whether a keyword search on the text indicates that the content includes spoilers for the event. For example, the media guidance application may search for certain keywords such as "surprise," "reveal," or "spoiler" in order to determine if the content contains spoilers. For instance, if the text comes from keyword field 506 of content entry 516 of database 500 (FIG. 5), the media guidance application may determine that the text included the keyword "spoilers," and that the content is therefore likely to contain spoilers. In general, the keywords being used by the media guidance application to perform the keyword search may include character names, actor names, band names, song titles, quotes from the content, or any other suitable type of keywords. In some embodiments, the media guidance application may select (e.g., via control circuitry 904 (FIG. 9)) one or more keywords to use in the keyword search based on the event. For example, if the event is a screening film "Harry Potter and the Half-Blood Prince," where one lead character kills another lead character, the media guidance application may select the names of the two lead characters as the keywords, along with the words "kill," "death," "twist," and "murder." As another example, if the event is the concert "Dolly Parton Sings!" featuring the artist "Dolly Parton," than any of the song titles or album titles from the complete discography of the artist "Dolly Parton" may be chosen as the keywords. In some embodiments, the media guidance application may also retrieve (e.g., via control circuitry 904 (FIG. 9)) the list of keywords to be used in the keyword search. For example, an external database may be maintained by content providers, content creators, other users, or any other interested party, storing keywords that may be used to identify the spoilers for particular events. In this case, the media guidance application may access the database (e.g., via communications network 1014 (FIG. 10)) and retrieve (e.g., via control circuitry 904 (FIG. 9)) the list of keywords to be used in the keyword search. As an alternate example, a list of keywords that may indicate the presence of spoilers for particular events may be stored as part of an events database (e.g., database 400 (FIG. 4)). In response to determining that the content includes spoilers for the event, process 1700 proceeds to 1720. For example, if the media guidance application searches through the text describing the content and determines that the text includes one or more keywords that indicate the potential presence of spoilers for the event, process 1700 proceeds to 1720 where the media guidance application will flag the identified content as potentially containing spoilers for the event. Alternately, in response to determining that the content does not include spoilers for the event, process 1700 proceeds to 1712. For example, if the media guidance application determines that the text associated with the content does not include any of the keywords used in the search, or otherwise does not indicate to the media guidance application that the content contains spoilers, process 1700 will proceed to 1712.

At 1712 the media guidance application determines (e.g., via control circuitry 904 (FIG. 9)) whether the metadata is associated with external data files. For example, the media guidance application may determine if the metadata includes a uniform resource locator (URL) linking to an external data file associated with the content. This may, for example, include links to transcripts of audio content, images from the content, written excerpts from the content, commentary on the content, or any other suitable type of file. In response to determining that the metadata is associated with external data files, process 1700 proceeds to 1714. For example, if the metadata indicates to the media guidance application that a summary of the content is available on a particular website, process 1700 proceeds to 1714 where the media guidance application may retrieve the summary from the website. Alternately, in response to determining that the metadata is not associated with external data files, process 1700 proceeds to 1718.

At 1714 the media guidance application retrieves (e.g., via control circuitry 904 (FIG. 9)) the external data files. For example, if the metadata indicated that the external data file was available at a particular website (e.g., as indicated by a URL), the media guidance application may download the external data file. In some embodiments, the media guidance application may access only a portion of the data file, and not retrieve the full external data file. For example, if the external data file is a large content database (e.g., database 500 (FIG. 5)), only a portion of which is related to the content, the media guidance application may simply query to the database for the relevant information related to the content rather than retrieving the entire database.

Process 1700 proceeds to 1716, where the media guidance application determines (e.g., via control circuitry 904 (FIG. 9)) whether the external data files indicate spoilers for the event. For example, if the external data file includes additional text describing the content (e.g., a summary of the content posted onto a website or online blog), the media guidance application may analyze the text using a keyword search similar to the search discussed in relation to sub-process 1710. In general, the media guidance application may use any suitable method to determine if the external data file indicates that the content contains spoilers for the event, which may include adapting any of the techniques discussed in relation to FIG. 17, FIG. 18, or any other portion of this disclosure. For example, the process 1800 (FIG. 18) discusses several methods for extracting text form data, any one of which may be used in conjunction with the keyword searching discussed in relation to sub-process 1710. In response to determining that the external data files indicate spoilers for the event, process 1700 proceeds to 1720. For example, if the media guidance application determines that a downloaded summary of the content includes multiple keywords that indicate that the content contains spoilers for the event, process 1700 proceeds to 1720 where the media guidance application flags the content as potentially containing spoilers for the event. Alternately, in response to determining that the external data files do not indicate spoilers for the event, process 1700 proceeds to 1718.

At 1718 the media guidance application flags (e.g., via control circuitry 904 (FIG. 9)) the identified content as not containing a potential spoiler for the event. For example, media guidance application may update a content database (e.g., database 500 (FIG. 5)) to indicate that the content contains potential spoilers for the event. For instance, the media guidance application may do this by updating (e.g., via control circuitry 904 (FIG. 9)) the content entry 514-520 associated with the content in database 500 (FIG. 5) to include the appropriate information in the associated content fields 510 and include "Yes" in spoiler information fields 512, if they do not exist already. In general, if process 1700 is being used as a subroutine to determine whether or not metadata indicates that the content includes spoilers for a particular event (e.g., as part of process 1100 (FIG. 11), process 1200 (FIG. 12), process 1300 (FIG. 13), or process 1400 (FIG. 14)), the subroutine will simply return a Boolean "true" value indicating that the content does include spoilers, and the media guidance application will proceed to take the appropriate steps to prevent the content from being presented to a user.

At 1720 the media guidance application flags (e.g., via control circuitry 904 (FIG. 9)) the identified content as containing a potential spoiler for the event. For example, media guidance application may update a content database (e.g., database 500 (FIG. 5)) to indicate that the content does not contain spoilers for the event. For instance, the media guidance application may do this by updating (e.g., via control circuitry 904 (FIG. 9)) the content entry 514-520 associated with the content in database 500 (FIG. 5) to include the appropriate information in the associated content fields 510 and include "No" in the spoiler information fields 512, if they do not exist already. In general, if process 1700 is being used as a subroutine to determine whether or not metadata indicates that the content includes spoilers for a particular event (e.g., as part of process 1100 (FIG. 11), process 1200 (FIG. 12), process 1300 (FIG. 13), or process 1400 (FIG. 14)), the subroutine will simply return a Boolean "false" value indicating that the content does not include spoilers, and the media guidance application does not need to prevent the content from being presented to a user.

It is contemplated that the steps or descriptions of FIG. 17 may be used with any other embodiment of this disclosure. In addition, the steps and descriptions described in relation to FIG. 17 may be done in alternative orders or in parallel to further the purposes of this disclosure. For example, the media guidance application may perform the subroutines at 1704, 1708, and 1712 in parallel, simultaneously checking if the content is explicitly associated with the event, checking whether the metadata includes text describing the content, and checking whether the metadata is associated with external data files. This may significantly reduce lag or increase the speed with which process 1700 may be performed. Furthermore, it should be noted that any of the devices or equipment discussed in relation to FIG. 9 or FIG. 10 or the databases discussed in relation to FIGS. 4-6 could be used to perform one or more of the steps in FIG. 17.

Figure 18:
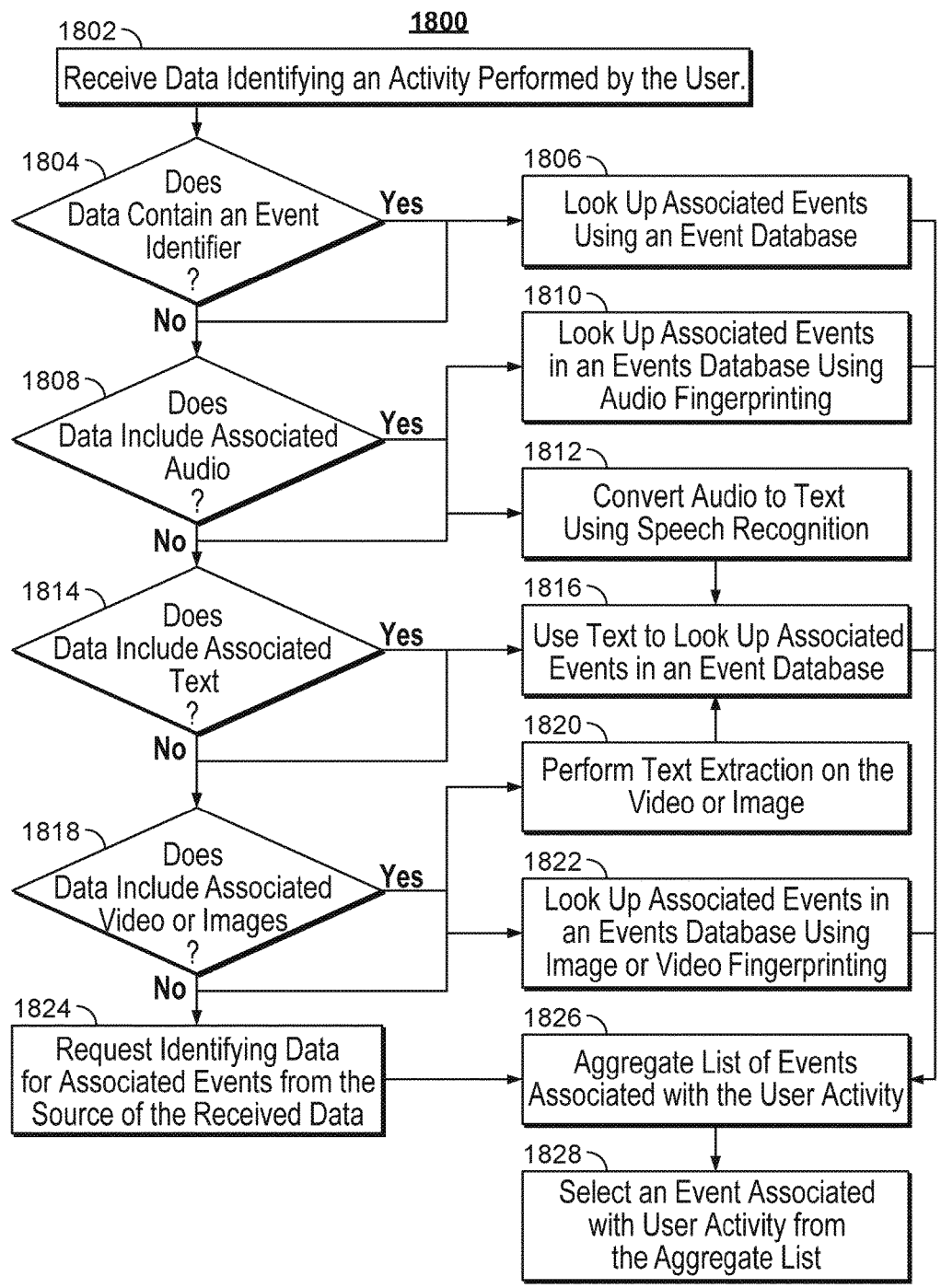
FIG. 18 is a flowchart of illustrative steps for determining events associated with an activity, in accordance with some embodiments of the disclosure.

FIG. 18 is a flowchart of illustrative steps for determining events associated with an activity, in accordance with some embodiments of the disclosure. For example, a media guidance application implementing process 1800 may be executed by control circuitry 904 (FIG. 9). It should be noted that process 1800 or any portion thereof could be performed on, or be provided by, any of the devices discussed in relation to FIG. 9 or FIG. 10, and utilize any of the databases discussed in relation to FIGS. 4-6. It should also be noted that process 1800 or any of the individual procedures discussed in relation to process 1800 may be combined with any of the other processes in this disclosure, including the processes discussed in relation to FIG. 11-17.

Process 1800 begins at 1802, where the media guidance application received (e.g., via control circuitry 904 (FIG. 9)) data identifying an activity performed by the user. For example, the media guidance application may receive data representing a purchase activity performed by the user (e.g., as part of process 1100 (FIG. 11) or process 1400 (FIG. 14)), or any of the types of data discussed in relation to FIG. 12 or 13. For example, the media guidance application may receive data indicating that the user accessed a television show or scheduled a recording for a media asset, data indicating that the user communicated text or images on social media, or any type of suitable data indicating a user activity.

Process 1800 continues to 1804, where the media guidance application determines (e.g., via control circuitry 904 (FIG. 9)) whether the received data contains an event identifier. For example, if the media guidance application received data indicating a user purchase, the received data may include a list of events associated with the user purchase. Similarly, if the received data included an indication that the user requested to record a particular program, the received data may include a list of events associated with that record request. For instance, if the received data indicated that the user requested to record a future broadcast, the particular broadcast that the user requested to record may be indicated to the media guidance application by means of an event identifier associated with that broadcast. In response to determining that the received data contains an event identifier, process 1800 proceeds to 1806 and 1808. Alternately, in response to determining that the received data does not contain an event identifier, process 1800 continues directly to 1808.

At 1806, the media guidance application uses the event identifier to look up (e.g., via control circuitry 904 (FIG. 9)) associated events using an events database (e.g., database 400 (FIG. 4)). For example, if the media guidance application determined that the received data includes the event ID "BB234," the media guidance application may search the event entries 412-414 for information fields matching the event ID "BB234," and determine that the identifier is associated with the event entitled "Jack White Croons!" represented by event entry 414. Process 1800 then proceeds to 1826, where the associated events identified using the various different methods are aggregated together. For example, the media guidance application may include the event entitled "Jack White Croons!" in the aggregated list of events created at 1826.

In some embodiments, if the media guidance application determines that there is a first event associated with the event identifier, the media guidance application may search for additional other events associated with that first event, and include those invents in the aggregated list. For example, the media guidance application may search the associated event information fields 408 for the event entry 414, and determine that the event entitled "Jack White Croons!" is also associated with the event entitled "Dolly Parton Sings!" represented by the event identifier "AA123." In this case, the media guidance application may then include the event entitled "Dolly Parton Sings!" in the aggregated list of events created at 1826.

Process 1800 continues to 1808, where the media guidance application determines (e.g., via control circuitry 904 (FIG. 9)) whether the received data includes associated audio. For example, the data received by the media guidance application may include a recording of the user describing the event, or the received data may include audio from some of the content being presented as part of the event. In response to determining that the received data includes associated audio, process 1800 proceeds to 1810, 1812, and 1814. Alternately, in response to determining that the received data does not include associated audio, process 1800 continues directly to 1814.

At 1810, the media guidance application uses the associated audio to look up (e.g., via control circuitry 904 (FIG. 9)) associated events in an events database using audio fingerprinting. For example, if the received audio was an excerpt from the song "Jolene" by the artist "Dolly Parton," the media guidance application may submit that audio sample to an audio fingerprinting service, and receive a list of events associated with the audio. In some embodiments, the media guidance application may only receive data identifying the song and the artist who performs the song. In this case, the media guidance application may then use this data to search an events database (e.g., database 400 (FIG. 4) and identify events associated with the original audio. For example, the media guidance application may search database 400 for event entries 412-430 that include information fields that include the name of the artist "Dolly Parton." The media guidance application may identify the event entitled "Dolly Parton Sings!" represented by event entry 412 as being associated with the audio. Process 1800 then proceeds to 1826, where the associated events identified using the various different methods are aggregated together. For example, if the media guidance application determined that the event entitled "Dolly Parton Sings!" is associated with the audio in the received data, the media guidance application may include the event entitled "Dolly Parton Sings!" in the aggregated list of events created at 1826.

At 1812, the media guidance application converts (e.g., via control circuitry 904 (FIG. 9)) the associated audio to text using speech recognition. In general, the media guidance application may use any suitable type of speech recognition technique to convert the received audio into text. This may include processing the received audio locally (e.g., via control circuitry 904 (FIG. 9)) on the same device running the media guidance application, or transmitting the received audio to an external service (e.g., via communications circuitry 1010 (FIG. 10)) to be converted. Process 1800 then proceeds from 1812 to 1816, where the media guidance application processes the received text to determine if there are events associated with the originally received audio. For example, if the media guidance application received audio containing a user's description of the event, and converted the audio to the text "I'm about to watch Owens cream the Yankees," this text may be used to search for associated events at 1816.

Process 1800 continues to 1814, where the media guidance application determines (e.g., via control circuitry 904 (FIG. 9)) whether the received data includes associated text. For example, the data received by the media guidance application may include the text of a social media communication made by the user describing the user's activities. As an alternate example, the received data may include a description of the activity performed by the user (e.g., a description of a purchase made by a user, or the name of a program that a user scheduled to record). In response to determining that the received data includes associated text, process 1800 proceeds to 1816 and 1818. For instance, if the received data includes a user's message posted to a social media platform, the media guidance application may use the text of the message, "excited about the game tonight," to search for associated events at 1816. Alternately, in response to determining that the received data does not include associated text, process 1800 continues directly to 1818.

At 1816, the media guidance application uses the text from 1812, 1814, and 1820, to look up (e.g., via control circuitry 904 (FIG. 9)) associated events in an events database. For example, if the original activity performed by the user was posting a short video to a social media platform along with an accompanying caption, the media guidance application may have received a transcribed copy of the audio in the video from 1812, the text of accompanying caption from 1814, and text extracted from the video from 1820. To look up events in the events database (e.g., database 400), the media guidance application may extract keywords from the text, and using those keywords to search associated events. For instance, if the media guidance application received the text "I'm about to watch Owens cream the Yankees," "excited about the game tonight," and "Fenway park," the media guidance application may extract the keywords "Owens" "Yankees" "Fenway" "Game" and "Tonight" and use those keywords to search for event entries 412-430 with matching information fields 402-410 in database 400 (FIG. 4). In this case, the media guidance application may determine that the text partially matches information fields for the event entitled "Yankees vs. Red Sox" represented by event entry 418, and the event entitled "Yankees vs. Rex Sox on ESPN" represented by event entry 420. Process 1800 then proceeds to 1826, where the associated events identified using the various different methods are aggregated. For instance, in the example above, the media guidance application may include the event entitled "Yankees vs. Red Sox" represented by event entry 418, and the event entitled "Yankees vs. Rex Sox on ESPN" represented by event entry 420 in the aggregated list.

Process 1800 continues to 1818, where the media guidance application determines (e.g., via control circuitry 904 (FIG. 9)) whether the received data includes associated video or images. For example, the data received by the media guidance application may include a photograph or short video recorded by the user. In response to determining that the received data includes associated video or images, process 1800 proceeds to 1820, 1822, and 1824. For example, if the media guidance application detects that the received data includes a short video recorded by the user, the media guidance application may process the video at 1820 and 1822 to search for related events. In response to determining that the received data does not include associated video or images, process 1800 continues directly to 1824.

At 1820 the media guidance application performs text extraction (e.g., via control circuitry 904 (FIG. 9)) on the video or image. In general, the media guidance application may use any suitable type of using optical character recognition or text extraction techniques, and may either process the data locally (e.g., via control circuitry 904 (FIG. 9)), or transmit the data to an external service (e.g., via communications circuitry 1010 (FIG. 10)) to be processed. Process 1800 then proceeds to 1816 (discussed above), where the extracted text used by the media guidance application to look up associated events in an events database. For example, if the received data included an image of the user outside of the venue where the event was hosted, the media guidance application may extract the text "Fenway park" from the image, and use this text to assist in identifying associated events.

At 1822 the media guidance application looks up (e.g., via control circuitry 904 (FIG. 9)) associated events in an events database using image or video fingerprinting. For example, if received data includes a video clip for a theatrical trailer of the movie "Evil Dead!," the media guidance application may submit that video clip, or an image taken from the video clip, to an video or image fingerprinting service, and receive a list of events associated with the video. In some embodiments, the media guidance application may only receive data identifying the video. In this case, the media guidance application may then use this data to search an events database (e.g., database 400 (FIG. 4) and identify events associated with the original image or video. For example, if the media guidance application receives information indicating that the video was a portion of a theatrical trailer for the movie "Evil Dead!," the media guidance application may search database 400 for event entries 412-430 that include information fields that include the name of the movie "Evil Dead." In this case, the media guidance application may identify event entries 428 and 430 that include information fields that contain the text "Evil Dead." The media guidance application Process 1800 then proceeds to 1826, where the associated events identified using the various different methods are aggregated. For instance, in the example above, the media guidance application may include the event entitled "Evil Dead!" represented by event identifier "JJ345" and the event entitled "See Evil Dead with Tom" event represented by event identifier "KK345" in the aggregated list of events created at 1826.

Process 1800 continues to 1824, where the media guidance application requests (e.g., via control circuitry 904 (FIG. 9)) identifying data for associated events from the source of the received data. For example, if the original data received by the media guidance application came from an online vender, and described a purchase made from the online vendor, the media guidance application may submit a request to the online vender (e.g., via communications circuitry 1010 (FIG. 10)) for events associated with the user's purchase activity. As an alternate example, if the received data came from a social media service, the media guidance application may query the social media service for events associated with the user activity. The media guidance application may then receive a list of events associated with the user activity. Process 1800 then proceeds to 1826, where the associated events identified using the various different methods are aggregated.

Process 1800 continues to 1826, where the media guidance application aggregates (e.g., via control circuitry 904 (FIG. 9)) a list of events associated with the user activity based on the results of process 1800 at 1806, 1810, 1816, 1822, and 1824. This may produce a more comprehensive list of possible events associated with the user activity than simply using the results of any of the sub-processes 1806, 1810, 1816, 1822, or 1824 alone. For example, if the results of sub-processes 1804 and 1806 determined that the received data contains an event identifier explicitly associated with the event entitled "Evil Dead!," and the results of sub-processes 1814 and 1816 determined that the received data contains text associated with the event entitled "The Walking Dead Season Premiere," the media guidance application may produce an aggregated list of events that includes both the event entitled "Evil Dead!" and the event entitled "The Walking Dead Season Premiere." In some embodiments, the aggregated list may include an indication of how many of the sub-processes 1806, 1810, 1816, 1822, or 1824 identified a particular event. For example, if all of the sub-processes 1806, 1810, 1816, 1822, and 1824 identified the event entitled "Evil Dead!," the aggregated list may include information indicating that the event entitled "Evil Dead!," was identified five times (e.g., by storing the list as a table with an entry for how many times each event was chosen, or by entering the event entitled "Evil Dead!" into the list multiple times). In some embodiments, the aggregated list may include an indication of which method was used to identify the event (e.g., which of the sub-processes 1806, 1810, 1816, 1822, and 1824 identified the event).

Process 1800 continues to 1828, where the media guidance application selects (e.g., via control circuitry 904 (FIG. 9)) an event associated with the user activity from the aggregated list. In general, the media guidance application may use any suitable process for selecting one or more of the events from the aggregated list produced by sub-process 1826. For example, the media guidance application may select one of the events at random from the aggregated list, or the media guidance application may select the first event alphabetically from the aggregated list. In some embodiments, if the aggregated list produced by sub-process 1826 contains only a single event, the media guidance application may select that event as the event associated with the user activity by default. In some embodiments, the media guidance application may simply select all of the events contained in the aggregated list as being associated with the user activity. In general, if process 1800 is being used as a subroutine to determine events associated with a particular user activity (e.g., as part of process 1100 (FIG. 11), process 1200 (FIG. 12), process 1300 (FIG. 13), or process 1400 (FIG. 14)), the subroutine may return one or more of the events contained in the aggregated list, identifying the events using either the event names, event identifiers, or the associated entries in an event database (e.g., by returning a pointer to the appropriate event entries 412-430 in database 400 (FIG. 4)).

In some embodiments, the media guidance application may determine if one or more of the events in the aggregated list were identified using multiple different methods (e.g., identified by multiple of the sub-processes 1806, 1810, 1816, 1822, or 1824), and select the event that was identified using the greatest number of different methods. For example, if the event entitled "Evil Dead!" was identified based on an explicit event identifier, received audio, and received text, (e.g., as determined by sub-processes 1806, 1810, and 1816), and all of the other events in the aggregated list were identified based on only one of these methods, the event entitled "Evil Dead!" may be selected as the event associated with the user activity.

In some embodiments, the media guidance application may select an event from the aggregated list based on which method was used to identify the event. For example, the media guidance application may always select an event that was included on the aggregated list because it was associated with the received data via an event identifier (e.g., as determined by sub-processes 1804 and 1806) if one is available.

It is contemplated that the steps or descriptions of FIG. 18 may be used with any other embodiment of this disclosure. In addition, the steps and descriptions described in relation to FIG. 18 may be done in alternative orders or in parallel to further the purposes of this disclosure. For example, the media guidance application may perform the subroutines at 1804, 1808, 1814, 1818, and 1824 in parallel, simultaneously checking all of the various ways that the received data may be used to identify associated events. This may significantly reduce lag or increase the speed with which process 1800 may be performed. Furthermore, it should be noted that any of the devices or equipment discussed in relation to FIG. 9 or FIG. 10 or the databases discussed in relation to FIGS. 4-6 could be used to perform one or more of the steps in FIG. 18.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for preventing a spoiler from being presented to a user based on past purchases, the method comprising:
receiving data representing purchase activity associated with the user, wherein the data includes a source of the purchase and purchase information;
retrieving the purchase information from the data;
searching, using the purchase information, an events database to identify an event entry having a first event information field that matches the purchase information;
determining whether the events database includes the event entry having the first event information field that matches the purchase information;
in response to determining that none of the event entries in the events database includes an event entry having an event information field that matches the purchase information, requesting the event information from the source of the purchase in the data;
receiving the event information requested from the source of the purchase in the data;
submitting, to the events database, a request to create a new event entry having a third event information field that matches the purchase information included in the received data, and a fourth event information field that matches the event information received;
selecting, based on the event information, an event associated with the purchase activity;
identifying content associated with the selected event;
processing metadata associated with the identified content to determine whether the metadata indicates that the identified content includes a spoiler for the selected event; and
preventing the identified content from being presented to the user in response to determining that the metadata indicates that the identified content includes the spoiler.

2. A method for preventing a spoiler from being presented to a user based on past purchases, the method comprising:
receiving data representing purchase activity associated with the user, wherein the data includes a source of the purchase and purchase information;
retrieving the purchase information from the data;
searching, using the purchase information, an events database to identify an event entry having a first event information field that matches the purchase information;
determining whether the events database includes the event entry having the first event information field that matches the purchase information;
in response to determining that none of the event entries in the events database includes an event entry having an event information field that matches the purchase information, requesting the event information from the source of the purchase in the data, wherein requesting, from the source of the purchase, event information associated with the purchase information comprises:
identifying the source that received the purchase from the user based on the received data;
searching for an account associated with the user for accessing the identified source; and
transmitting a request to the source, based on the determined account, for the event information associated the purchase;
selecting, based on the event information, an event associated with the purchase activity;
identifying content associated with the selected event;
processing metadata associated with the identified content to determine whether the metadata indicates that the identified content includes a spoiler for the selected event; and
preventing the identified content from being presented to the user in response to determining that the metadata indicates that the identified content includes the spoiler.

3. The method of claim 2, wherein the transmitted request comprises user credentials, the user credentials being usable by the source to verify that the request was approved by the user.

4. The method of claim 1, wherein:
the selected event includes at least one of a movie presented in a movie theater, a concert, a live event, a media asset scheduled for transmission, and a calendar appointment; and
the content includes at least one of a media asset, a social media communication, an advertisement, a text or SMS message, and a commercial.

5. The method of claim 1, wherein identifying the content comprises:
monitoring other content being accessed by the user; and
searching for a plurality of content likely to be accessed by the user within a threshold period of time in the future.

6. The method of claim 1 further comprising:
storing, in a purchase activities database, purchase activities associated with the user, wherein the purchase activities database includes a plurality of purchase activity entries, each purchase activity entry includes a purchase source field and an event information field; and
adding to the purchase activities database a new purchase activity entry for the received purchase activity associated with the user based on the event information associated with the purchase information.

7. The method of claim 1, wherein selecting an event associated with the purchase activity comprises;
identifying, using the events database, an event associated with the event information;
determining, using the events database, a plurality of related events associated with the identified event; and
selecting, as the event associated with the purchase activity, one of the plurality of related events.

8. The method of claim 1, wherein preventing the identified content from being presented comprises:
receiving, from the user, a request to access the identified content; and
presenting, to the user, in response to receiving the request, alternate content different from the identified content.

9. The method of claim 1, wherein preventing the identified content from being presented comprises:
determining an end time for the event associated with the purchase activity; and
preventing the identified content from being presented in response to determining that the current time is earlier than the end time.

10. The method according to claim 1, further comprising:
in response to determining that the events database includes the event entry having the first event information field that matches the purchase information, retrieving event information from a second event information field associated with the event entry.

11. A system for preventing a spoiler from being presented to a user based on past purchases, the system comprising:

storage circuitry; and control circuitry configured to:

receive data representing purchase activity associated with the user, wherein the data includes a source of the purchase and purchase information;

retrieve the purchase information from the data;

search, using the purchase information, an events database to identify an event entry having a first event information field that matches the purchase information;

determine whether the events database includes the event entry having the first event information field that matches the purchase information;

in response to determining that none of the event entries in the events database includes an event entry having an event information field that matches the purchase information, request the event information from the source of the purchase in the data;

receive the event information requested from the source of the purchase in the data;

submit, to the events database, a request to create a new event entry having a third event information field that matches the purchase information included in the received data, and a fourth event information field that matches the event information received;

select, based on the event information, an event associated with the purchase activity;

identify content associated with the selected event;

process metadata associated with the identified content to determine whether the metadata indicates that the identified content includes a spoiler for the selected event; and prevent the identified content from being presented to the user in response to determining that the metadata indicates that the identified content includes the spoiler.

12. The system of claim 11, wherein:

the selected event includes at least one of a movie presented in a movie theater, a concert, a live event, a media asset scheduled for transmission, and a calendar appointment; and the content includes at least one of a media asset, a social media communication, an advertisement, a text or SMS message, and a commercial.

13. The system of claim 11, wherein the control circuitry configured to identify the content is further configured to:

monitor other content being accessed by the user; and search for a plurality of content likely to be accessed by the user within a threshold period of time in the future.

14. The system of claim 11, wherein the control circuitry is further configured to:

store, in a purchase activities database, purchase activities associated with the user, wherein the purchase activities database includes a plurality of purchase activity entries, each purchase activity entry includes a purchase source field and an event information field; and add to the purchase activities database a new purchase activity entry for the received purchase activity associated with the user based on the event information associated with the purchase information.

15. The system of claim 11, wherein the control circuitry configured to select an event associated with the purchase activity is further configured to;

identify, using the events database, an event associated with the event information;

determine, using the events database, a plurality of related events associated with the identified event; and select, as the event associated with the purchase activity, one of the plurality of related events.

16. The system of claim 11, wherein the control circuitry configured to prevent the identified content from being presented is further configured to:

receive, from the user, a request to access the identified content; and present, to the user, in response to receiving the request, alternate content different from the identified content.

17. The system of claim 11, wherein the control circuitry configured to prevent the identified content from being presented is further configured to:

determine an end time for the event associated with the purchase activity; and prevent the identified content from being presented in response to determining that the current time is earlier than the end time.

18. The system of claim 11, wherein the control circuitry configured to prevent the identified content from being presented is further configured to:

in response to determining that the events database includes the event entry having the first event information field that matches the purchase information, retrieve event information from a second event information field associated with the event entry.

19. A system for preventing a spoiler from being presented to a user based on past purchases, the system comprising:

storage circuitry; and control circuitry configured to:

receive data representing purchase activity associated with the user, wherein the data includes a source of the purchase and purchase information;

retrieve the purchase information from the data;

search, using the purchase information, an events database to identify an event entry having a first event information field that matches the purchase information;

determine whether the events database includes the event entry having the first event information field that matches the purchase information;

in response to determining that none of the event entries in the events database includes an event entry having an event information field that matches the purchase information, request the event information from the source of the purchase in the data, wherein the control circuitry configured to request, from the source of the purchase, event information associated with the purchase information is further configured to:

identify the source that received the purchase from the user based on the received data;

search for an account associated with the user for accessing the identified source; and transmit a request to the source, based on the determined account, for the event information associated the purchase;

select, based on the event information, an event associated with the purchase activity;

identify content associated with the selected event;

process metadata associated with the identified content to determine whether the metadata indicates that the identified content includes a spoiler for the selected event; and prevent the identified content from being presented to the user in response to determining that the metadata indicates that the identified content includes the spoiler.

20. The system of claim 19, wherein the transmitted request comprises user credentials, the user credentials being usable by the source to verify that the request was approved by the user.

* * * * *